US008723906B2

(12) United States Patent
Ninomiya

(10) Patent No.: US 8,723,906 B2
(45) Date of Patent: May 13, 2014

(54) IMAGE-FORMING APPARATUS AND METHOD FOR CONTROLLING IMAGE-FORMING APPARATUS

(71) Applicant: KYOCERA Document Solutions Inc., Osaka (JP)

(72) Inventor: Yuichi Ninomiya, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 5 days.

(21) Appl. No.: 13/656,696

(22) Filed: Oct. 20, 2012

(65) Prior Publication Data

US 2013/0100226 A1   Apr. 25, 2013

(51) Int. Cl.
  *B41J 2/47*   (2006.01)
  *B41J 2/435*   (2006.01)

(52) U.S. Cl.
  USPC .......................................... 347/235; 347/250

(58) Field of Classification Search
  USPC .................................. 347/235, 250
  See application file for complete search history.

(56) References Cited

U.S. PATENT DOCUMENTS

| | | | |
|---|---|---|---|
| 6,285,383 B1* | 9/2001 | Klement et al. | 347/116 |
| 2007/0216757 A1* | 9/2007 | Ishikawa et al. | 347/247 |
| 2011/0129244 A1* | 6/2011 | Shoji et al. | 399/51 |

FOREIGN PATENT DOCUMENTS

| | | |
|---|---|---|
| JP | 2004-330691 A | 11/2004 |
| JP | 2008-149581 A | 7/2008 |

OTHER PUBLICATIONS

English Abstract for JP 2004-330691 A, published Nov. 25, 2004.
Translation and English Abstract for JP 2008-149581 A, published Jul. 3, 2008.

* cited by examiner

*Primary Examiner* — Alessandro Amari
*Assistant Examiner* — Kendrick Liu
(74) *Attorney, Agent, or Firm* — NDQ&M Watchstone LLP

(57) ABSTRACT

This image-forming apparatus includes a plurality of photosensitive drums, a plurality of laser scanning units, and a motor control unit. A motor control unit detects the time difference between a change point of the detection signal of a reference color and the change points of colors targeted for phase correction, and, when the absolute value of the time difference is greater than a threshold, carries out a rough adjustment process for reducing the time difference by a drive signal with which a base period has been changed by a first period change amount and thereafter carries out a fine adjustment process for reducing the time difference by a drive signal with which the base period has been changed by a second period change amount smaller than the first period change amount.

16 Claims, 13 Drawing Sheets

IMAGE-FORMING APPARATUS AND METHOD FOR CONTROLLING IMAGE-FORMING APPARATUS

This application is based upon and claims the benefit of priority from the corresponding Japanese Patent Application No. 2011-230695 filed Oct. 20, 2011, the entire contents of which are incorporated herein by reference.

BACKGROUND

The present disclosure relates to an image-forming apparatus for scanning to expose a photosensitive drum to a laser to form an image (toner image).

Conventionally, a rotating polygon mirror may be made to reflect a laser beam and a lens, mirror, or the like may be used to form an electrostatic latent image on a photosensitive drum, thus forming a toner image. When such a laser beam is reflected and scanned to expose the photosensitive drum, it is necessary to appropriately control a variety of parameters, such as the start timing for the scanning and exposure of each of the lines and the rotational speed of the polygon mirror.

One known example is an image-forming apparatus for causing a rotating polygonal mirror to reflect an exposure beam controlled in accordance with an image clock and using a rotating process member to form/develop/transfer an electrostatic latent image and obtain an image, wherein the speed variance of the process member is detected and the rotational speed of the rotational polygonal mirror, the frequency of the image clock, and the light intensity of the exposure beam are controlled in accordance with the detected speed variance.

Some image-forming apparatuses form a toner image in each color on a plurality of photosensitive drums and superimpose the toner images in each color to carry out color printing (also sometimes called a tandem scheme). Because of the superimposition of the toner images in each color, the toner images in each color sometimes have uneven densities and/or misaligned positions, whereupon the image quality is degraded. In view whereof, the phases of the polygon mirrors (polygon motors) for each color are sometimes matched.

For example, the inputting of a print start command into an operation panel, the receipt of image data, or the like serves as a trigger for printing to start. In association with the start of printing, the polygon motors for each color, which rotate the polygon mirrors, are rotated up to a reference speed that has been determined in advance. Then, in order to be able to match the angle of rotation (phase) of the polygon mirror (polygon motor) for a color serving as a reference, the rotational speed of the polygon motors for the colors other than the reference color (colors targeted for phase correction) are intentionally shifted from the reference speed. The phase difference is continually reduced and, once the phase difference reaches an acceptable range, the polygon motors for the colors targeted for phase correction are returned to the reference speed.

From the standpoint of the ability of the polygon motors to track and respond to speed variance, it is desirable to lower as much as possible the amount of change from the reference speed to change the rotational speeds of the polygon motors of the colors targeted for phase correction, in order to be able to accurately and precisely match the phases of each of the polygon mirrors. For this reason, during the correction of the phase difference, it is more preferable for the rotational speed of the polygon motors not to be over-shifted with respect to the reference speed.

On the other hand, from the standpoint of starting printing as quickly as possible, it is desirable to rapidly complete the correction of the phase differences of each of the polygon motors and to shorten the time needed to bring an exposure device to a state where printing is possible. However, when the amount of change from the reference speed is lowered as much as possible and the rotational speed of the polygon motors for the colors targeted for phase correction is changed to correct the phase difference, a problem emerges in that it is a long time until the phase difference between the polygon mirror (polygon motor) of the reference color and the polygon mirrors (polygon motors) of the colors targeted for phase correction falls within the acceptable range.

With the above-mentioned known image-forming apparatus, a variety of processes and controls such as for changing the image clock and changing the intensity of the exposure beam are performed to prevent a degradation in the quality of the image. However, there is no adjustment for the phase difference between the polygon mirrors (polygon motors) for each color. As such, when the amount of change from the reference speed is lowered as much as possible and the rotational speed of the polygon motors for the colors targeted for phase correction is changed to correct the phase difference, it is not possible to address the problem which emerges in that it is a long time until the phase difference falls within the acceptable range.

SUMMARY

With the foregoing problems in view, it is an objective to curtail the time required for phase correction while the phase difference between the polygon mirror of the reference color and the polygon mirrors of the colors targeted for phase correction is accurately being made fall within the acceptable range.

In order to overcome the problems, an image-forming apparatus according to a first aspect of the present disclosure comprises a plurality of photosensitive drums, a plurality of laser scanning units, and a motor control unit. The plurality of photosensitive drums are provided for every color. Each of the plurality of laser scanning units comprises a laser-light-emitting unit for switching a laser beam on and off in accordance with image data, a polygon mirror for reflecting the laser beam emitted by the laser-light-emitting unit while also rotating to scan and expose the corresponding photosensitive drum, the polygon mirror having a plurality of reflective surfaces, a polygon motor for rotating the polygon mirror, the rotational speed of the polygon motor changing in accordance with the frequency of a provided drive signal, and a light-receiving unit for outputting a detection signal having an output value which changes when the laser beam is received, the light-receiving unit being provided within a range of irradiation with the laser beam by the polygon mirror. The laser scanning units scan and expose the corresponding photosensitive drum and form a toner image of respectively different colors. The motor control unit provides the drive signal of a predetermined base period to the polygon motors and causes the polygon motors to rotate such that each of the polygon motors rotates at the same speed, detects the time difference between a change point of the detection signal of the laser scanning unit of a reference color and the change points of the detection signals of the laser scanning units of colors targeted for phase correction other than the reference color is detected, and, when the absolute value of the time difference is greater than a predetermined threshold, carries out a rough adjustment process in which the drive signal with which the base period has been shorted or lengthened by a first period change amount causes the polygon motors of the colors targeted for phase correction to rotate and the time difference to decrease, or, when the absolute value is not greater than the threshold, carries out a fine adjustment process in which, until the time difference falls within a predetermined acceptable range, the drive signal with which the base period has been shortened or lengthened by a second period change amount smaller than the first period change amount with respect to the base period causes the polygon motors of the colors targeted for phase correction to rotate and the time difference to decrease.

Further features and advantages of the present disclosure will become apparent from the description of embodiments given below.

DETAILED DESCRIPTION

Provided below is a description of an embodiment of the present disclosure, with reference to FIGS. 1 to 16. This description relates to an example in which a multifunctional peripheral 100 serves as the image-forming apparatus. However, the configurations, arrangements, and other various elements described in this embodiment do not limit the scope of the disclosure but rather are provided merely by way of descriptive example.

(Summary of the Image-Forming Apparatus)

Figure 1:
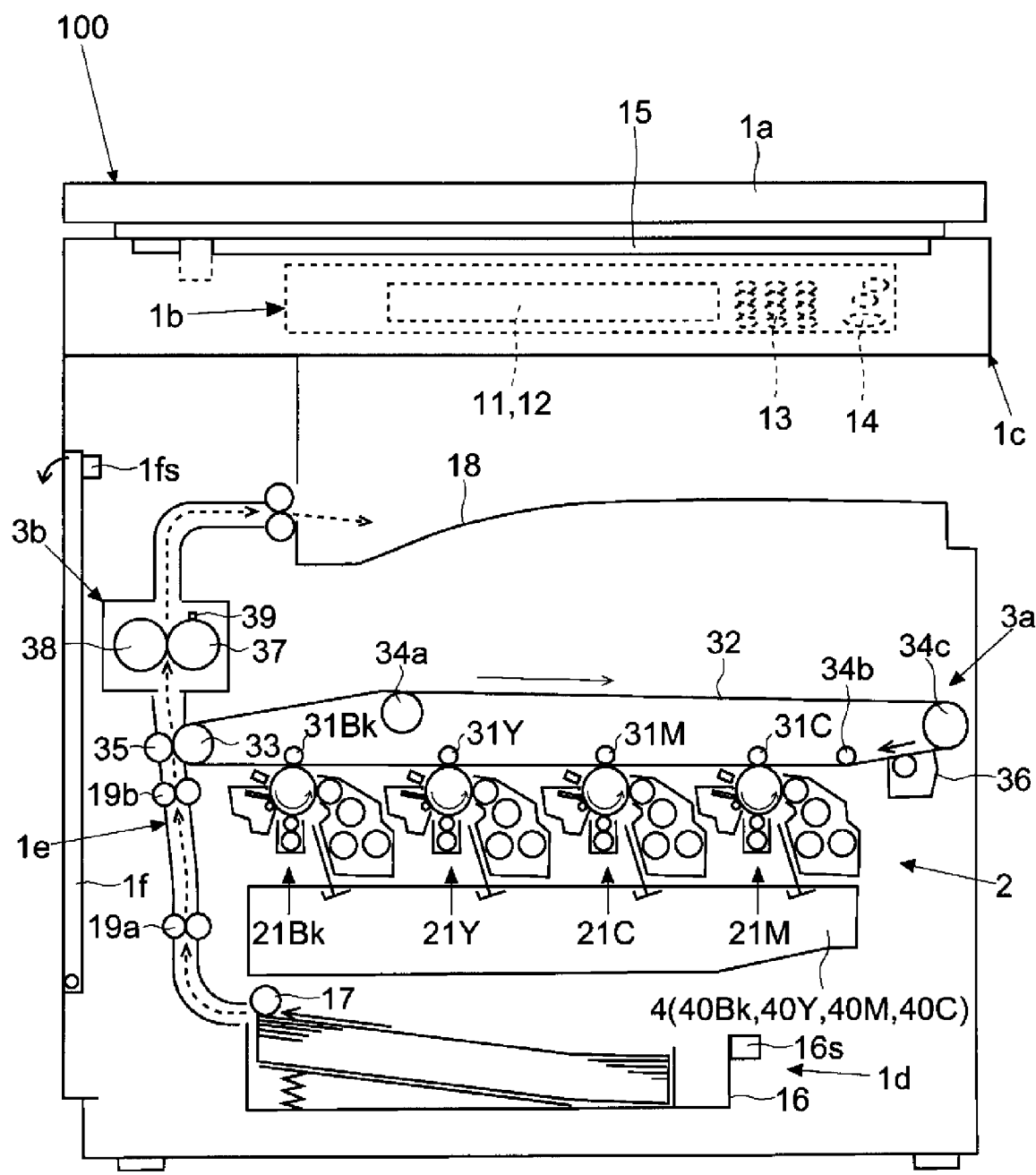
FIG. 1 is a schematic front cross-sectional view illustrating one example of a multifunctional peripheral.
Figure 2:
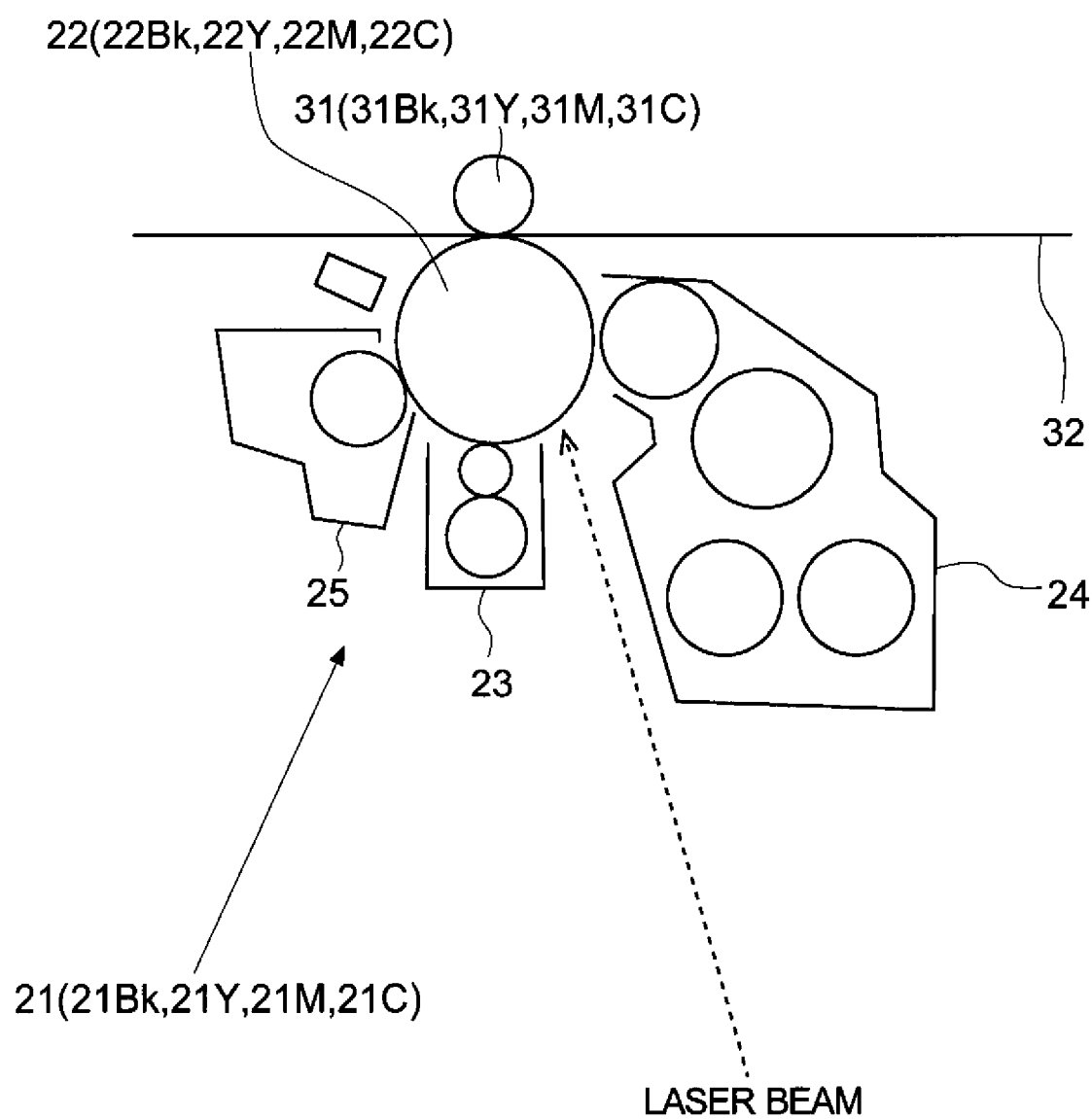
FIG. 2 is an enlarged, schematic cross-sectional view of an image formation unit.

The description shall first relate to a summary of the multifunctional peripheral 100 according to an embodiment, with reference to FIGS. 1 and 2. FIG. 1 is a schematic front cross-sectional view illustrating one example of the multifunctional peripheral 100. FIG. 2 is an enlarged, schematic cross-sectional view of an image formation unit 21.

As illustrated in FIG. 1, the multifunctional peripheral 100 of the embodiment has a document cover 1a on an uppermost part. An operation panel 1b is also provided to the top of a front surface of the multifunctional peripheral 100. An image reading unit 1c, paper feed unit 1d, conveyor unit 1e, image formation part 2 (including an exposure device 4), intermediate transfer unit 3a, fixing unit 3b, and the like are provided to the main body of the multifunctional peripheral 100.

As illustrated by the dashed line in FIG. 1, the operation panel 1b is provided to the top of the front surface of the multifunctional peripheral 100. The operation panel 1b is also provided with a display unit 11. A touch panel unit 12 is provided to an upper surface of the display unit 11. Also, for example, the operation panel 1b is provided with a keypad unit 13 and a start key 14.

The document cover 1a has a pivot point behind the plane of the drawing in FIG. 1. The document cover 1a is able to open and close in the vertical direction of the paper plane. During reading of a document, the document cover 1a presses a document that has been placed on a contact glass 15 used for placing and reading documents.

The image reading unit 1c reads the document and forms image data relating to the document. The image reading unit 1c reads the document placed on the contact glass 15 for placement/reading, and generates the image data.

For example, the paper feed unit 1d includes a cassette 16. A paper feed roller 17 issues paper to the conveyor unit 1e. The conveyor unit 1e guides the paper supplied from the paper feed unit 1d, to a discharge tray 18 by way of the intermediate transfer unit 3a and the fixing unit 3b. A pair of conveyor rollers 19a and/or a pair of resist rollers 19b and the like are provided to the conveyor unit 1e.

As illustrated in FIGS. 1 and 2, the image formation part 2 includes image formation units 21 and an exposure device 4 for four different colors. More specifically, with respect to the image formation unit 21, the multifunctional peripheral 100 is provided with an image formation unit 21Bk for forming a black image, an image formation unit 21Y for forming a yellow image, an image formation unit 21M for forming a magenta image, and an image formation unit 21C for forming a cyan image.

FIG. 2 shall now be used to provide a more detailed description of each of the image formation units 21Bk-21C. Respective photosensitive drums 22Bk-22C (four different colors, where 22Bk is for black, 22C is for cyan, 22M is for magenta, and 22Y is for yellow) provided to each of the image formation units 21Bk-21C carry a toner image on a peripheral surface. Respective electrification devices 23 electrify the photosensitive drums 22 with a constant potential. The exposure device 4 switches a laser beam (depicted by a dashed line) on and off to produce output, on the basis of a signal indicative of the switching on or off of the beam as generated on the basis of image data. The exposure device 4 scans to expose each of the photosensitive drums 22Bk-22C after electrification, and form an electrostatic latent image. Respective development devices 24 accommodate a developing agent for the corresponding color. Respective cleaning devices 25 clean the photosensitive drums 22.

The description again relates to FIG. 1. The intermediate transfer unit 3a includes, inter alia, respective primary transfer rollers 31Bk-31C, an intermediate transfer belt 32, a drive roller 33, follower rollers 34a-34c, a secondary transfer roller 35, and a belt cleaning device 36. The primary transfer rollers 31Bk-31C and the corresponding photosensitive drums 22Bk-22C sandwich the endless intermediate transfer belt 32. A transfer voltage is applied to each of the primary transfer rollers 31Bk-31C.

The intermediate transfer belt 32 is strapped onto the drive roller 33 and the like. The drive roller 33 is connected to a motor or similar drive mechanism (not shown). The intermediate transfer belt 32 is turned by the rotational drive of the drive roller 33. The drive roller 33 and the second transfer roller 35 sandwich the intermediate transfer belt 32. The toner images (for each color, i.e., for black, yellow, cyan, and magenta) formed by each of the image formation units 21Bk-21C are sequentially superimposed and undergo primary transfer to the intermediate transfer belt 32. Thereafter, the toner images are transferred to the paper by the secondary transfer roller 35 to which the predetermined voltage has been applied.

The fixing unit 3b applies heat and pressure to fix the toner images having undergone secondary transfer to the paper. The paper onto which the toner images have been transferred is passed through the nip portion of a heating roller 37 and a pressure roller 38, whereby heat and pressure are applied. As a result, the toner images are fixed to the paper, and the paper is discharged to the discharge tray 18.

(Configuration of the Exposure Device 4)

Figure 3:
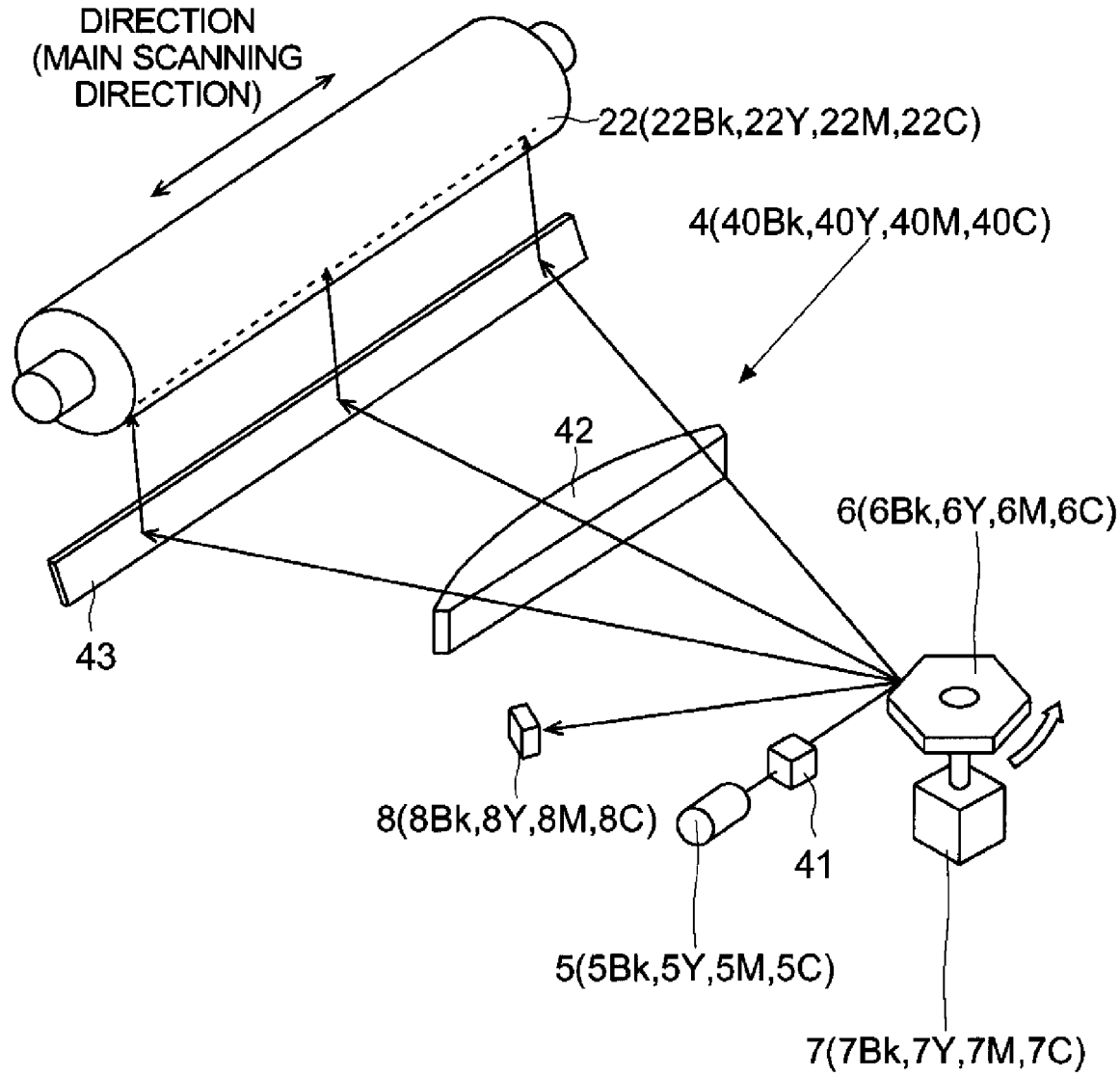
FIG. 3 is a schematic view illustrating one example of an exposure device.

The description shall now relate to one example of the exposure device 4 according to the embodiment, with reference to FIG. 3. FIG. 3 is a schematic view illustrating one example of the exposure device 4. In FIG. 3, the depiction is of the configuration for one color.

Firstly, FIG. 3 shall be used to describe a summary of the scanning and exposure of the photosensitive drum 22 using the exposure device 4. Respective laser scanning units 40 (40Bk, 40Y, 40M, 40C) include, inter alia, a laser-light-emitting unit 5, a lens 41, a polygon mirror 6, a polygon motor 7, an f-theta lens 42, a mirror 43, and a light-receiving unit 8.

The exposure device 4 of the present embodiment includes the laser scanning unit 40Bk for black, the laser scanning unit 40Y for yellow, the laser scanning unit 40M for magenta, and the laser scanning unit 40C for cyan, for a total of four laser scanning units 40 (for the sake of simplicity, only one is depicted in FIG. 3).

Laser-light-emitting units 5Bk-5C emit a laser beam. The exposure device 4 of the present embodiment includes the laser-light-emitting unit 5Bk for black, the laser-light-emitting unit 5Y for yellow, the laser-light-emitting unit 5M for magenta, and the laser-light-emitting unit 5C for cyan.

The polygon mirror 6 for reflecting the laser beam is also provided so as to correspond to each of the laser-light-emitting units 5Bk-5C. The lens 41 is provided respectively between each of the laser-light-emitting units 5Bk-5C and polygon mirrors 6Bk-6C (for the sake of simplicity, the reference numerals for the lenses 41 omit an indication of the distinction between the colors Bk, Y, M, and C).

The polygon motor 7 is provided to each of the polygon mirrors 6Bk-6C. In the present embodiment, the exposure device 4 includes the polygon motor 7Bk for black, the polygon motor 7Y for yellow, the polygon motor 7M for magenta, and the polygon motor 7C for cyan, for a total of four polygon motors 7.

The exposure device 4 is also provided with the f-theta lens 42 for evening, in a main scanning direction, the scanning and exposure speed of the photosensitive drum 22 by the laser beams emitted by each of the polygon mirrors 6Bk-6C, as well as with the mirror 43 for reflecting the laser beams toward each of the photosensitive drums 22Bk-22C (for the sake of simplicity, the reference numerals for the f-theta lenses 42 and the mirrors 43 omit an indication of the distinction between the colors Bk, Y, M, C).

Each of the laser scanning units 40 (40Bk-40C) irradiates each of the photosensitive drums 22Bk-22C from the exposure device 4 with a laser beam, and an electrostatic latent image matched to the image data is formed on each of the photosensitive drums 22Bk-22C.

Each of the laser scanning units 40 (40Bk-40C) includes the light-receiving unit 8, which has been provided in an irradiation range for irradiation of the laser beam in the main scanning direction (within a scanning range), and outside of an irradiation range for irradiating the photosensitive drums 22. The exposure device 4 of the present embodiment includes a light-receiving unit 8Bk for black, a light-receiving unit 8Y for yellow, a light-receiving unit 8M for magenta, and a light-receiving unit 8C for cyan, for a total of four light-receiving units 8. The output current (output voltage) for each of the light-receiving units 8Bk-8C changes between the presence and absence of laser beam irradiation. For example, each of the light-receiving units 8Bk-8C is a circuit including a light-receiving element (for example, a photodiode) and the like. The timing for exposing (writing on) the photosensitive drums 22 at respective lines is taken on the basis of the outputs of each of the light-receiving units 8Bk-8C.

(Hardware Configuration of the Multifunctional Peripheral 100)

Figure 4:
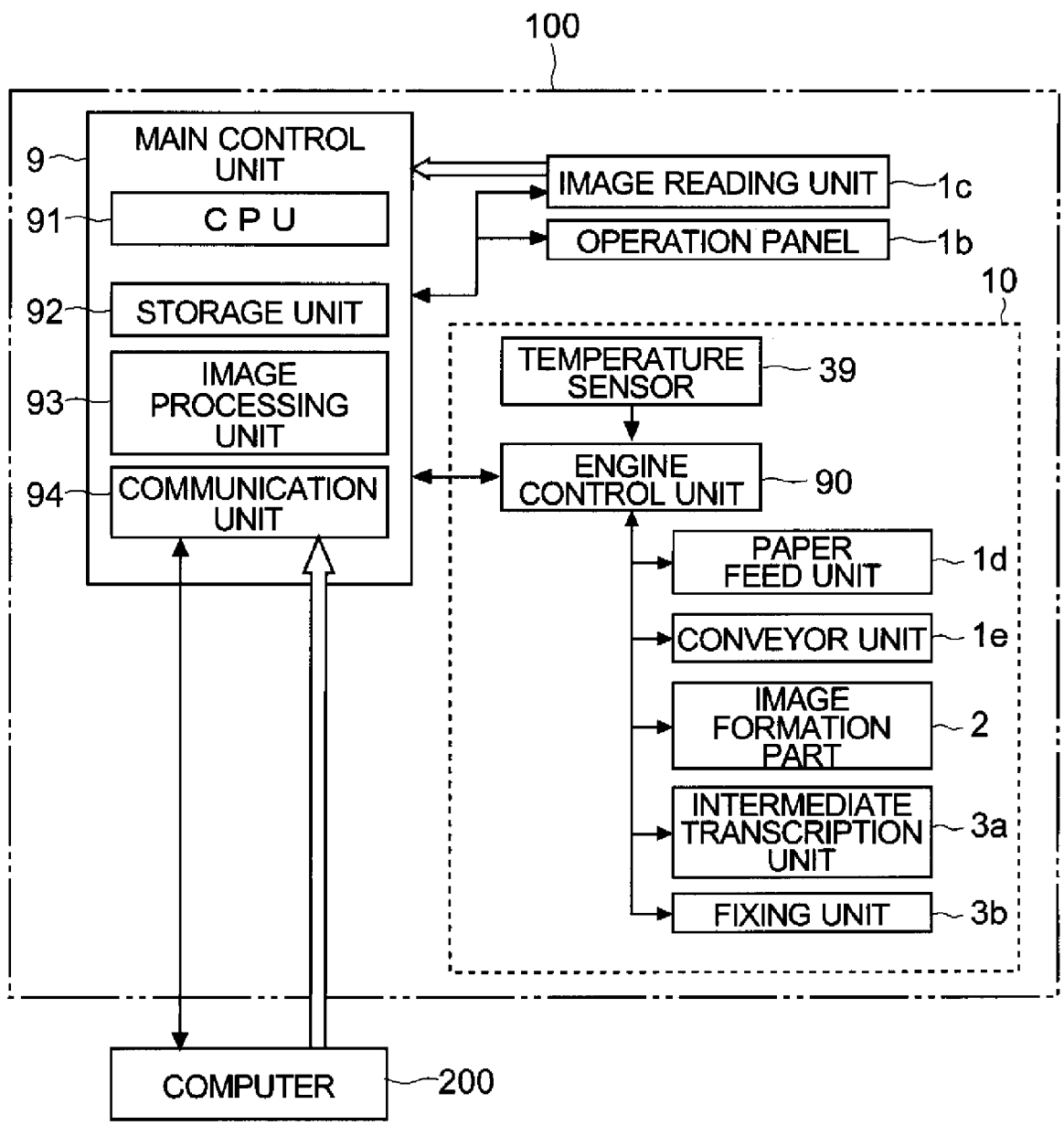
FIG. 4 is a block diagram illustrating one example of a hardware configuration for a multifunctional peripheral.

The description shall now relate to the hardware configuration of the multifunctional peripheral 100 according to the embodiment, on the basis of FIG. 4. FIG. 4 is a block diagram for illustrating one example of the hardware configuration for the multifunctional peripheral 100.

As illustrated in FIG. 4, the multifunctional peripheral 100 of the present embodiment has a main control unit 9 on the interior. The main control unit 9 controls each of the parts of the multifunctional peripheral 100. For example, the main control unit 9 includes a CPU 91, a storage unit 92, an image processing unit 93, and the like.

The CPU 91 is a central computation and processing device, and performs computations and controls each of the parts of the multifunctional peripheral 100 on the basis of a control program stored and deployed in the storage unit 92. The storage unit 92 is constituted of a combination of volatile and non-volatile storage devices, such as ROM, RAM, and flash ROM. For example, the storage unit 92 stores, inter alia, the control program and control data for the multifunctional peripheral 100.

The main control unit 9 is connected so as to be able to communicate with an engine control unit 90 for controlling a portion relating to printing (a printing engine unit 10). The engine control unit 90 turns on and off the exposure device 4, image formation, motors for rotating the various rotating bodies, and the like, on the basis of a command from the main control unit 9, and controls the portions and members that relate to printing. The engine control unit 90 maintains actual control over the behaviors of the paper feed unit 1d, the conveyor unit 1e, the image formation part 2, the exposure device 4, the intermediate transfer unit 3a, the fixing unit 3b, and the like.

The main control unit 9 also includes a communication unit 94. The communication unit 94 includes, inter alia, a chip, memory, connector, and circuit for communication. The communication unit 94 and a computer 200 (for example, a personal computer 200, a server, or the like) are connected together so as to be able communicate via a network or cable. Printing data which includes data indicative of what is to be printed and data for printing settings is inputted via the communication unit 94 from the computer 200 into the main control unit 9. Also inputted into the main control unit 9 is image data relating to the document that has been read by the image reading unit 1c. The image processing unit 93 subjects the image data from the computer 200 or from the image reading unit 1c to a variety of image processes, such as enlarging, shrinking, contrast stretching, and data format conversion, in accordance with the settings on the operation panel 1b and/or the settings in the printing data. The image processing unit 93 then sends the image-processed image data to the exposure device 4. On receiving the image data, the exposure device 4 scans and exposed each of the photosensitive drums 22Bk-22C.

The main control unit 9 is also connected, inter alia, to the operation panel 1b and the image reading unit 1c. The main control unit 9 controls the behavior of each of the parts on the basis of the settings made with the operation panel 1b such that image formation is carried out properly on the basis of the image data obtained from the reading of the document by the image reading unit 1c and the control program and data in the storage unit 92.

(Switching On and Off of the Laser-Light-Emitting Units 5)

Figure 5:
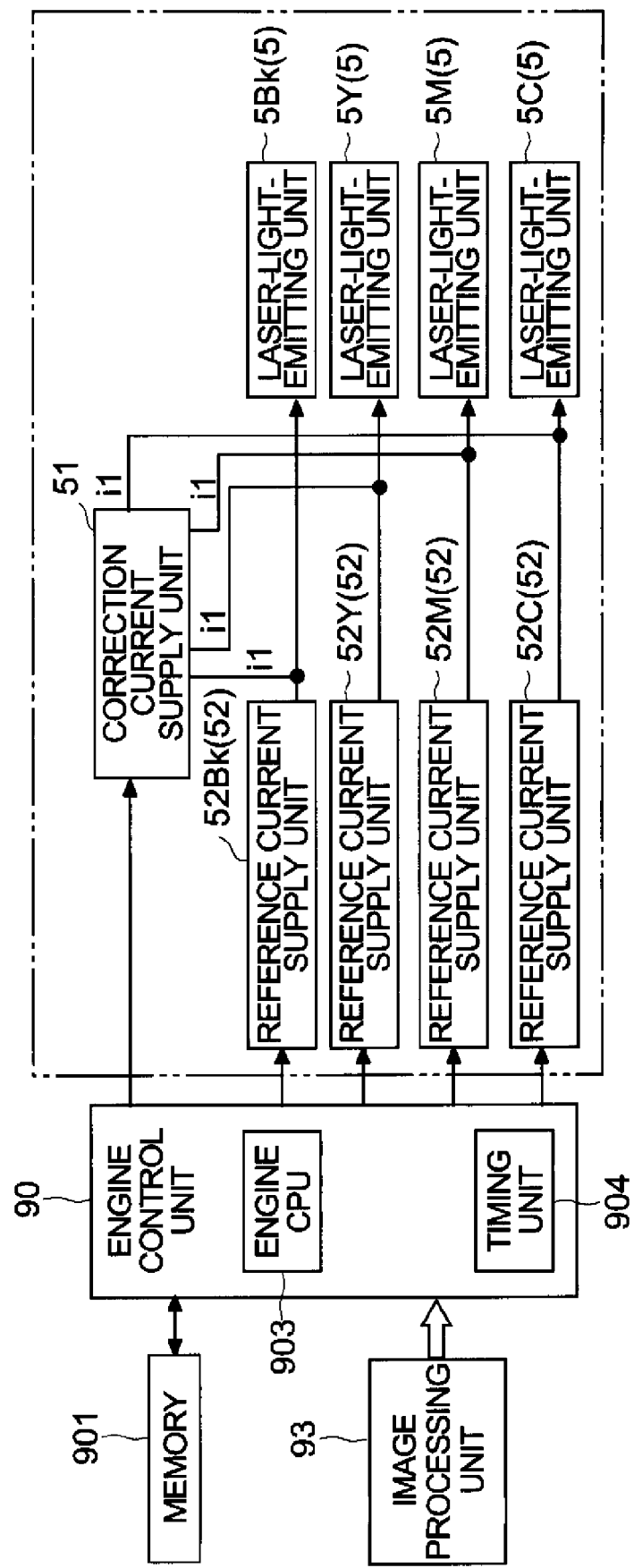
FIG. 5 is a block diagram illustrating one example of a hardware configuration relating to the switching on and off of a laser-light-emitting unit.
Figure 6:
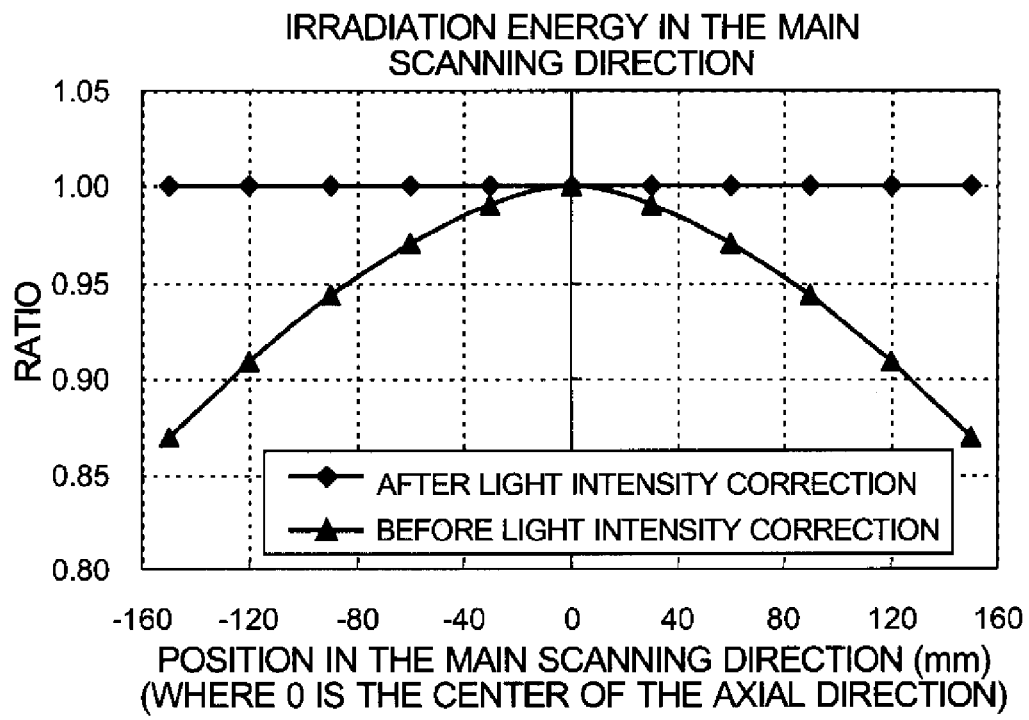
FIG. 6 is a graph illustrating one example of the energy received by a photosensitive drum (the received light intensity) at each of the positions in a main scanning direction.
Figure 7:
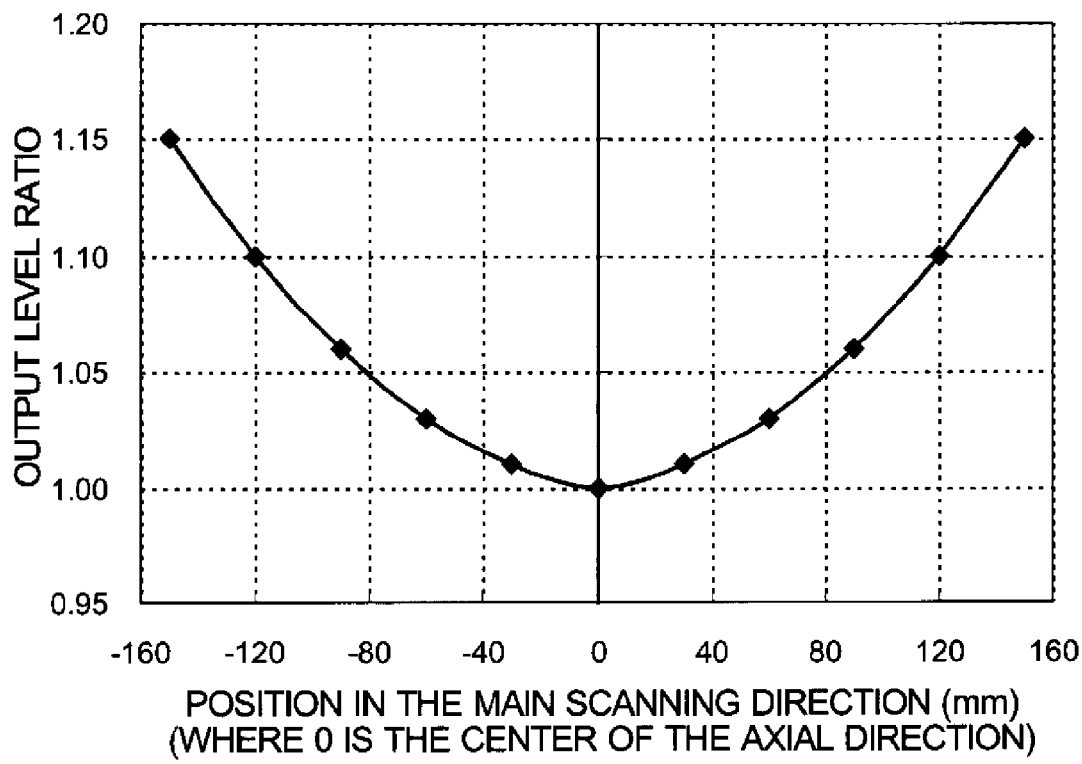
FIG. 7 is a graph illustrating one example of the output ratio of the laser-light-emitting unit when a correction is performed for the light-emitting level in accordance with the position of the photosensitive drum in the main scanning direction.

The description shall now relate to a summary of the on/off switching control of each of the laser-light-emitting units 5Bk-5C according to the embodiment, with reference to FIGS. 5 to 7. FIG. 5 is a block diagram illustrating one example of a hardware configuration relating to the switching on and off of the laser-light-emitting units 5. FIG. 6 is a graph illustrating one example of the energy received by the photosensitive drums 22 (the received light intensity) at each of the positions in the main scanning direction. FIG. 7 is a graph illustrating one example of the output ratio of the laser-light-emitting units 5 when a correction is performed for the light-emitting level in accordance with the position of the photosensitive drums 22 in the main scanning direction.

As illustrated in FIG. 5, in the multifunctional peripheral 100 of the present embodiment, the engine control unit 90 controls the switching on and off of each of the laser-light-emitting units 5Bk-5C. The engine control unit 90 controls the switching on and off of each of the laser-light-emitting units 5Bk-5C on the basis of the image data. Separately from the engine control unit 90, there may also be provided a dedicated IC or similar circuit for controlling the switching on and off of the laser-light-emitting units 5Bk-5C on the basis of a command from the engine control unit 90.

The exposure device 4 is also provided with one correction current supply unit 51 and a plurality of reference current supply units 52 for supplying a current to each of the laser-light-emitting units 5Bk-5C. More specifically, a reference current supply unit 52Bk for black, a reference current supply unit 52Y for yellow, a reference current supply unit 52M for magenta, and a reference current supply unit 52C for cyan are provided.

One reference current supply unit 52 is respectively provided to each of the laser-light-emitting units 5Bk-5C (for a total of four reference current supply units). Each of the reference current supply units 52 outputs and supplies to each of the laser-light-emitting units 5Bk-5C a current that has been adjusted such that each of the laser-light-emitting units 5Bk-5C emits light on the same level (a current that has been adjusted such that the light emission level of each of the laser-light-emitting units 5Bk-5C reaches a reference level), in accordance with the light emission properties of each of the laser-light-emitting units 5Bk-5C. A reference output value for the currents respectively determined for each of the laser-light-emitting units 5Bk-5C is stored in a memory 901 (for example, a flash ROM). When the photosensitive drums 22 are to be exposed, a value indicative of the magnitude of current that is to be outputted for each of the reference current supply units 52 (the reference output value) is acquired from the memory 901, and the reference output value is sent to each of the reference current supply units 52.

When each of the photosensitive drums 22Bk-22C is to be exposed for printing, the engine control unit 90 respectively sends the reference output value to each of the reference current supply units 52. The reference current supply units 52 output a current in accordance with the commanded reference output value from the engine control unit 90. Thereby, each of the laser-light-emitting units 5Bk-5C reach substantially the same light emission level (reference output or reference emitted light intensity), provided that they are at the same scanning position. In the present embodiment, the engine control unit 90 sends the reference output value to each of the reference current supply units 52 by a digital value. For this reason, each of the reference current supply units 52 is, for example, a digital/analog converter (DAC) for outputting a current in accordance with the magnitude of the reference output value.

By contrast, one correction current supply unit 51 is provided to the laser-light-emitting units 5Bk-5C. The correction current supply unit 51 outputs a current for correcting the light emission level of a beam irradiated in accordance with the positions of the photosensitive drums 22 in the main scanning direction (in accordance with each pixel), and supplies the same current (depicted as "i1" in FIG. 5) to each of the laser-light-emitting units 5Bk-5C.

When the photosensitive drums 22 are to be exposed, the engine control unit 90 sends a value indicative of the magnitude of current that is to be outputted (a correction output value) to the correction current supply unit 51. The correction current supply unit 51 outputs a current in accordance with the commanded correction output value from the engine control unit 90. In the present embodiment, the engine control unit 90 sends the correction output value to the correction current supply unit 51 by a digital value. For this reason, the correction current supply unit 51 is, for example, a digital/analog converter (DAC) for outputting a current in accordance with the magnitude of the correction output value. The correction current supply unit 51 and the reference current supply units 52 may be of the same circuit (of the same type of circuit).

The description thus now relates to the variance in the energy received by the photosensitive drums 22 (received light intensity) at each of the positions in the main scanning direction, with reference to FIG. 6. It is specifically assumed that the energy received by the photosensitive drum 22 at the pixel portion undergoing exposure (the light intensity of the received laser beam) is desirably uniform in the main scanning direction (the horizontal line in FIG. 6) because of the potential to cause color unevenness or the like.

However, as described above, the polygon mirrors 6, the f-theta lenses 42, and the mirrors 43, inter alia, are provided in the exposure device 4 in order for the laser beams to reach the photosensitive drums 22 from each of the laser-light-emitting units 5Bk-5C. In the exposure device 4 of the present embodiment, each of the polygon mirrors 6Bk-6C are provided so as to correspond to a center position of the photosensitive drums 22 in the main scanning direction. For this reason, greater separation from the center position of the photosensitive drums 22 in the main scanning direction correlates to a greater angle of incline at which the laser beams are incident on the f-theta lenses 42, the mirrors 43, and the photosensitive drums 22. The reflectivity of the mirrors 43 changes depending on the angle of incidence of the laser beams, and the transmittance (attenuation rate) of the f-theta lenses 42 changes depending on the angle of incidence of the laser beams. In general, a more acute angle of incidence correlates to a greater degree to which the beams after transmission are attenuated.

For this reason, even though the light emitted by the laser beams is at a constant level for the scanning of the photosensitive drums 22, the energy received by the photosensitive drums 22 varies in accordance with the position in the main scanning direction, as indicated in FIG. 6 by the upwardly curved line. More specifically, in the multifunctional peripheral 100 of the present embodiment, the energy received by the photosensitive drums 22 is increasingly attenuated closer to the end part of the photosensitive drums 22.

Thus, as illustrated in FIG. 7, the engine control unit 90 of the present embodiment performs a similar correction for each of the laser-light-emitting units 5Bk-5C, in which the current being supplied is increased more closer to the end part of the photosensitive drums 22. This causes the energy received by the photosensitive drums 22 to be uniform in the main scanning direction, as illustrated by the horizontal line in FIG. 6. In order to correct the light emission levels of each of the laser-light-emitting units 5Bk-5C in accordance with the exposure position in the main scanning direction, the engine control unit 90 causes the correction current supply unit 51 to change (adjust) the current being outputted (supplied) to each of the laser-light-emitting units 5Bk-5C during scanning (exposure) of a single line.

Correction data indicative of which correction output value is to be given (data indicative of the correction output value for each pixel) in accordance with the position of the photosensitive drums 22 in the main scanning direction (in accordance with the pixel) is stored in the memory 901, which is connected to the engine control unit 90. The memory 901 may also be built into the engine control unit 90. When the photosensitive drums 22 are to be exposed, the engine control unit 90 acquires the correction data from the memory 901 and sequentially sends the correction output value to the correction current supply unit 51 on the basis of the correction data.

As illustrated in FIG. 5, a current in which the current i1 outputted by the correction current supply unit 51 has been superimposed onto the current outputted by the corresponding reference current supply unit 52 is sent to each of the laser-light-emitting units 5Bk-5C. When scanning is to be performed to expose the photosensitive drums 22, each of the laser-light-emitting units 5Bk-5C receives this current and outputs a laser beam.

(Rotational Control of each of the Polygon Mirrors 6Bk-6C)

Figure 8:
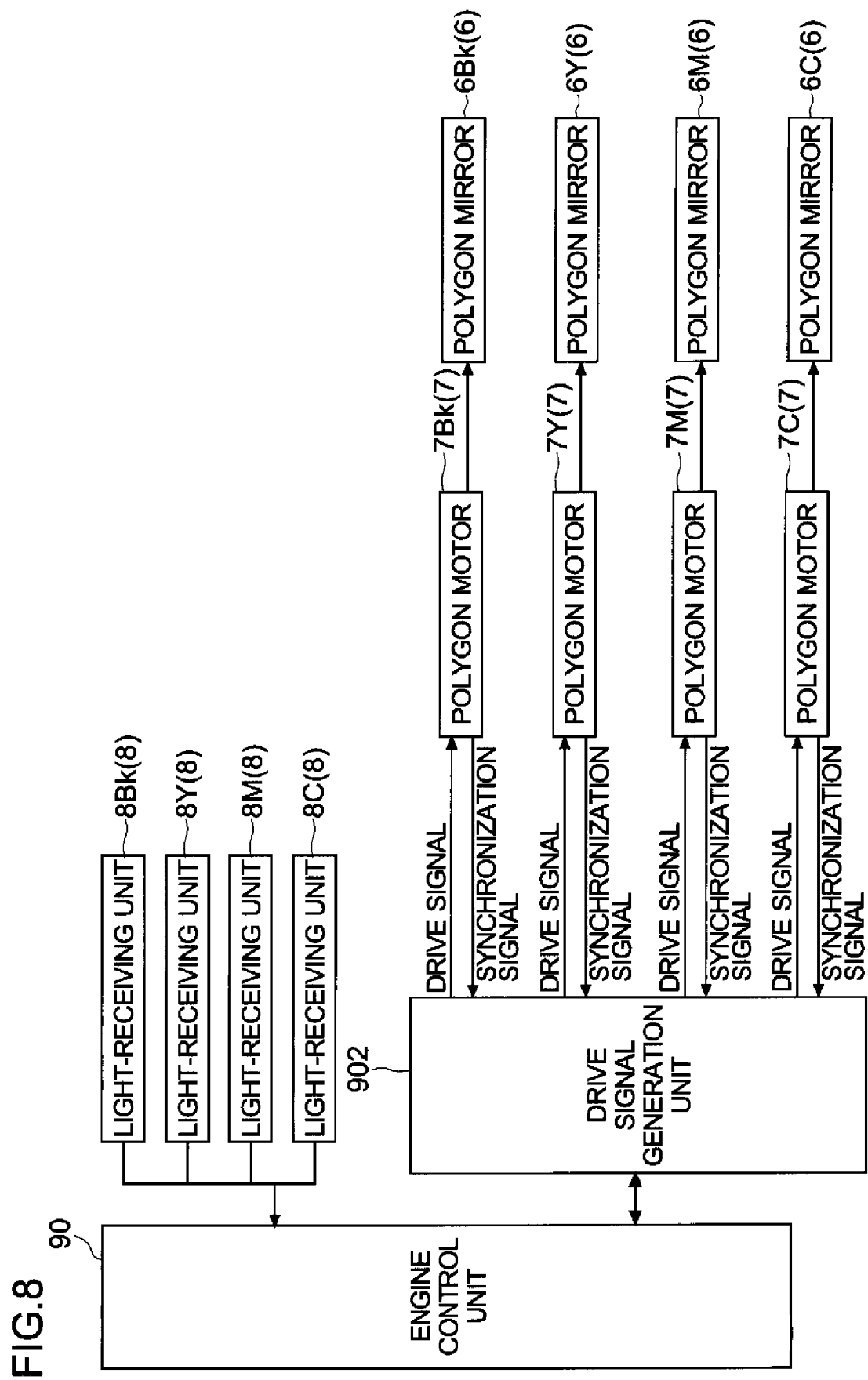
FIG. 8 is a block diagram illustrating one example of a hardware configuration relating to the rotation of each of the polygon mirrors.

The description shall now relate to a summary of the rotational control of each of the polygon mirrors 6Bk-6C (each of the polygon motors 7Bk-7C) according to the embodiment, with reference to FIG. 8. FIG. 8 is a block diagram illustrating one example of a hardware configuration relating to the rotation of each of the polygon mirrors 6Bk-6C.

As illustrated in FIG. 8, in the multifunctional peripheral 100 of the present embodiment, the engine control unit 90 controls the on/off status and rotational speed of each of the polygon motors 7Bk-7C. The engine control unit 90 causes each of the polygon motors 7Bk-7C to rotate when printing starts as well as during printing. Separately from the engine control unit 90, there may also be provided a dedicated IC or similar circuit for controlling the rotation of each of the polygon motors 7Bk-7C on the basis of a command from the engine control unit 90.

Each of the polygon motors 7Bk-7C is a similar motor (a motor of a similar specification), which receives the input of a drive signal (for example, a clock signal) and rotates. The rotational speed of each of the polygon motors 7Bk-7C changes in accordance with the period (frequency) of the drive signal. The engine control unit 90 sends a command to a drive signal generation unit 902 and, at the time of printing, causes a drive signal of the same period (frequency) to be inputted to each of the polygon motors 7Bk-7C. This makes it possible for each of the polygon motors 7Bk-7C to rotate at the same speed (synchronously) during printing.

A synchronization signal indicative of the fact that rotation is being performed in accordance with the period (frequency) of the drive signal is outputted from each of the polygon motors 7Bk-7C to the drive signal generation unit 902 (may be the engine control unit 90). This makes it possible for the engine control unit 90 to communicate with the drive signal generation unit 902 and check whether or not the synchronous rotation each of the polygon motors 7Bk-7C has shifted.

The drive signal generation unit 902 is also able to alter the period (frequency) of the drive signal. For example, the drive signal generation unit 902 is a pulse-width modulation (PWM) circuit capable of altering the period (frequency) of the drive signal in accordance with a command from the engine control unit 90.

In this manner, the engine control unit 90 controls the on/off status of each of the polygon motors 7Bk-7C. More specifically, in order to cause each of the polygon motors 7Bk-7C to rotate, the engine control unit 90 sends to the drive signal generation unit 902 a generation command for the drive signal as well as data indicative of the period (frequency) of the drive signal that is to be generated, and controls the on/off status and rotational speed of each of the polygon motors 7Bk-7C. When scanning is to be performed to expose each of the photosensitive drums 22Bk-22C, the engine control unit 90 causes each of the polygon motors 7Bk-7C to rotate and, when a print job has been completed, causes each of the polygon motors 7Bk-7C to stop.

The output of each of the light-receiving units 8Bk-8C is also inputted to the engine control unit 90. The engine control unit 90 is able to check, inter alia, whether the rotational speeds of each of the polygon motors 7Bk-7C are identical by checking the period of the change in output of each of the light-receiving units 8Bk-8C. For example, the light-receiving unit 8 for black serves as a reference for the engine control unit 90 to determine the timing for writing on the lines of each of the laser-light-emitting units 5Bk-5C. The use of the change in output of each of the light-receiving units 8Bk-8C as a synchronization signal makes it possible to match the write position for each of the lines.

(Normal Mode and Power Saving Mode)

Figure 9:
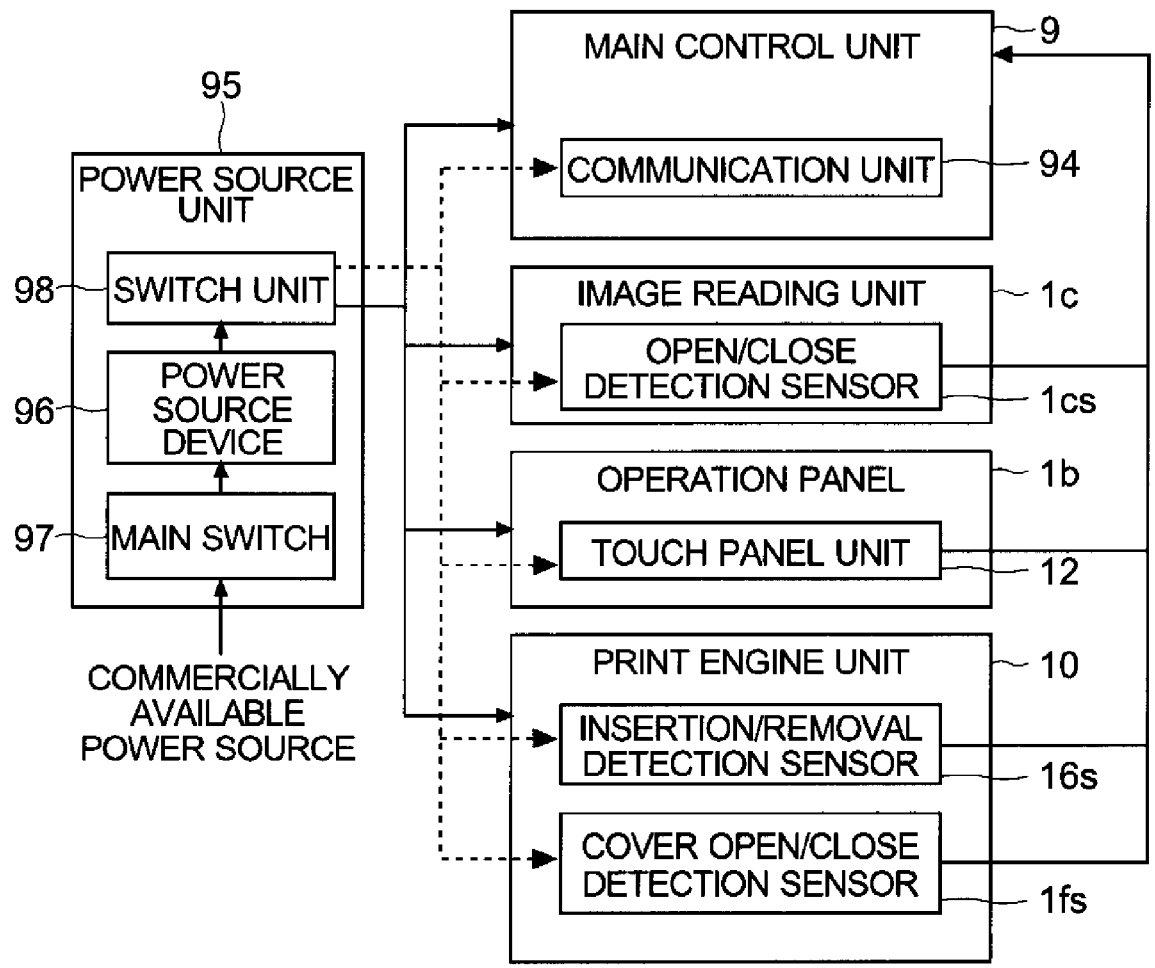
FIG. 9 is a block diagram illustrating one example of a power supply system.
Figure 10:
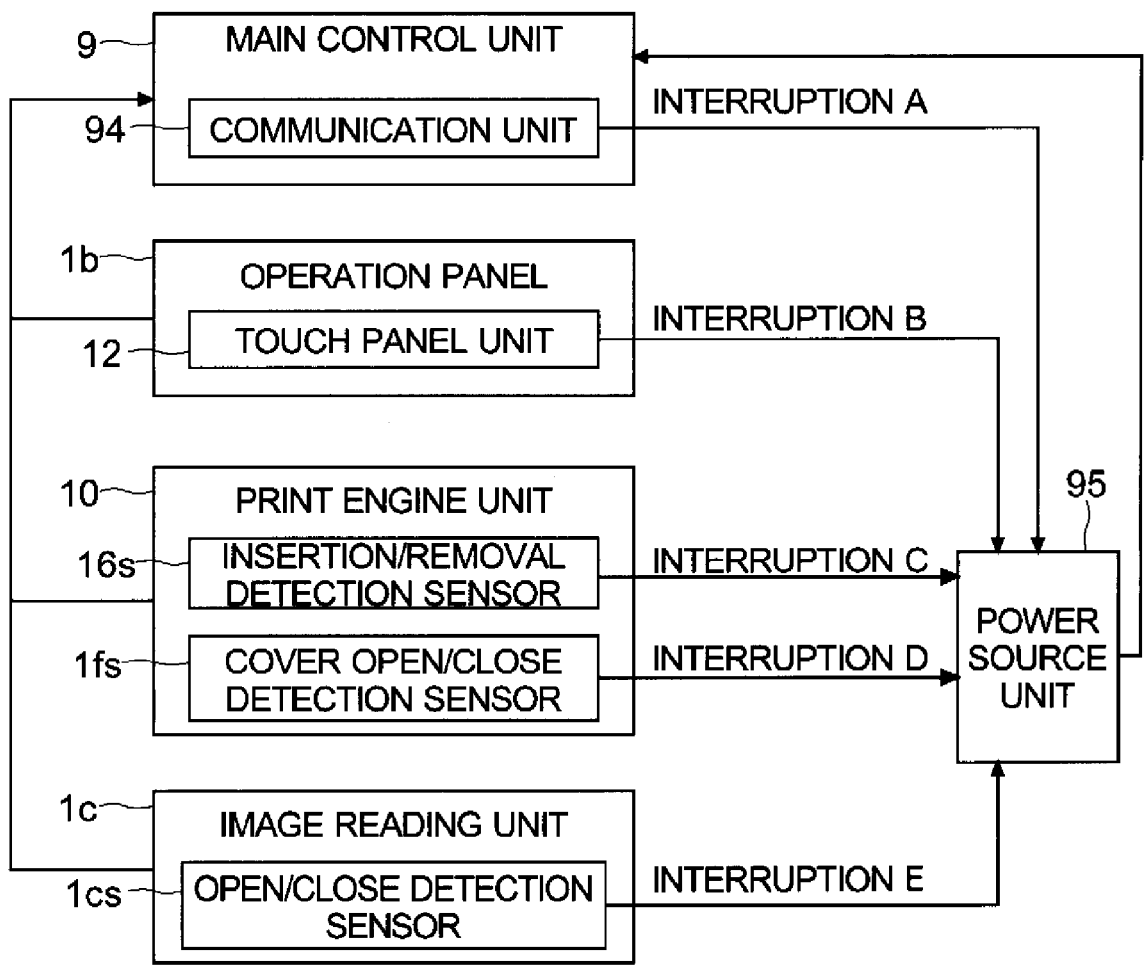
FIG. 10 is a block diagram for describing an operation input detection unit.

The description shall now relate to a normal mode and power saving mode in the multifunctional peripheral 100 of the embodiment, with reference to FIGS. 9 and 10. FIG. 9 is a block diagram illustrating one example of a power supply system. FIG. 10 is a block diagram for illustrating an operation input detection unit.

Firstly, as illustrated in FIG. 9, the multifunctional peripheral 100 is provided with a power source unit 95 for generating a variety of different voltages and for supplying power at an appropriate voltage to each of the portions constituting the multifunctional peripheral 100. The power source unit 95 is provided with power source device 96 for generating a plurality of voltage types required for the behaviors of the multifunctional peripheral 100, the power source device comprising, inter alia, a rectifier circuit, a booster circuit, and a step-down circuit, and being connected to a commercially available power source.

A main switch 97 is provided in order to switch on and off the connection between the power source device 96 and the commercially available power source. For example, the main switch 97 is a rocker switch, and is provided to a side surface or the like of the multifunctional peripheral 100. A user is able to switch the on/off status of the main power source of the multifunctional peripheral 100 using the main switch 97.

As illustrated in FIG. 9, the power source unit 95 also includes a switch unit 98. The switch unit includes a plurality of semiconductor switches or similar switches. The switch unit 98 turns on and off the power supply to each of the parts of the multifunctional peripheral 100, such as to the main control unit 9. With the on/off switch, the switch unit 98 switches between distributing and blocking power to the main control unit 9, the image reading unit 1c, the operation panel 1b, the printing engine unit 10, and the like. In other words, the power source unit 95 uses the switch unit 98 to open or close a power supply line from the power source device 96 to the main control unit 9 and elsewhere, and controls the on/off state of the power supply to each of the parts.

In the normal mode, the power source unit 95 supplies power to all portions within the multifunctional peripheral 100, including the main control unit 9, the image reading unit 1c, the operation panel 1b, and the printing engine unit 10. The power source unit 95 maintains the multifunctional peripheral 100 in a state where all types of jobs can be executed. When the main power source is turned on by the main switch 97, the power source unit 95 supplies power within the normal mode.

By contrast, when a condition for transitioning to the power saving mode is fulfilled, the main control unit 9 transitions the mode of the multifunctional peripheral 100 to the power saving mode. In association with the transition to the power saving mode, the power source unit 95 stops the power supply to the main control unit 9, the image reading unit 1c, the operation panel 1b, the printing engine unit 10, and elsewhere, and reduces the power consumption.

An example of a condition for transitioning to the power saving mode could be when a predetermined transition period has elapsed since the normal mode came into effect without there being any operation or input with respect to an operation input detection unit (to be described in greater detail below) or, alternatively, without there being any operation or input with respect to the operation input detection unit since the complete execution of a job. In other words, the condition for transitioning to the power saving mode could be when the predetermined transition period (for example, several minutes to several tens of minutes, can be set using the operation panel 1b) has elapsed with a standby state remaining in effect.

There are a plurality of the operation input detection units provided within the multifunctional peripheral 100. During the normal mode, the output of each of the operation input detection units is transmitted to the main control unit 9. The main control unit 9 recognizes whether or not the predetermined transition period has elapsed without there being any operation or input with respect to the operation input detection units on the basis of the output of each of the operation input detection units.

Firstly, an example of an operation input detection unit within the main control unit 9 is the communication unit 94. When the communication unit 94 has received image data for printing or print settings data from the external computer 200, the main control unit 9 recognizes that an operation or input has been made with respect to the multifunctional peripheral 100. As another example, the touch panel unit 12 of the operation panel 1b is used as an operation input detection unit. When the touch panel unit 12 is pressed, the main control unit 9 recognizes that an operation or input has been made with respect to the multifunctional peripheral 100.

An insertion/removal detection sensor 16s for detecting insertion or removal of the cassette 16 or a cover open/close detection sensor 1fs for detecting the opening or closing of the cover can also be used as operation input detection units. The main control unit 9 recognizes an operation or input to the multifunctional peripheral 100 on the basis of the output of the insertion/removal detection sensor 16s or the cover open/close detection sensor 1fs. As another example, an open/close detection sensor 1cs for detecting raising or lowering (opening/closing) of the document cover 1a of the image reading unit 1c can also be used as an operation input detection unit. The main control unit 9 recognizes an operation or input to the multifunctional peripheral 100 on the basis of the output of the open/close detection sensor 1cs. The open/close detection sensor 1cs detects whether the document cover 1a is open or closed. For example, the open/close detection sensor 1cs is provided to a position in contact with the document cover 1a on an upper surface of the image reading unit 1c. The open/close detection sensor 1cs may be an interlocking-type switch in contact with a lower surface of the document cover 1a, or may be a reflective optical sensor, provided that it is able to detect an open or closed state.

When the normal mode is in effect, the main control unit 9 resets the count for the transition period upon recognition of an operation or input to the multifunctional peripheral 100 by an operation input detection unit. However, when the transition period elapses without there being any operation or input with respect to each of the operation input detection units, the main control unit 9 commands the power source unit 95 to transition to the power saving mode. The power supply mode of the power source unit 95 is thereby made to be the power saving mode.

In the power saving mode, the power source unit 95 stops the supply of power to the main control unit 9, the image reading unit 1c, the operation panel 1b, the print engine unit 10, and the like. For this reason, the state in effect is such that copying, scanning, sending, and other functions of the multifunctional peripheral 100 cannot be used. As such, in order for a user to be able to use the multifunctional peripheral 100, it is necessary for the power supply mode of the power source unit 95 to be returned from the power saving mode to the normal mode and for the supply of power to the main control unit 9, the image reading unit 1c, the operation panel 1b, the print engine unit 10, the document cover 1a, and the like to be restored.

The power source unit 95 receives an interruption (output) from each of the operation input detection units as a trigger for the return from the power saving mode to the normal mode. When such an interruption has taken place, the power source unit 95 restores the supply of power to the main control unit 9, the image reading unit 1c, the operation panel 1b, the print engine unit 10, the document cover 1a, and the like, and causes the multifunctional peripheral 100 to return from the power saving mode to the normal mode (see FIG. 9).

As illustrated by the dashed line in FIG. 9, in order for the power source unit 95 to return to the normal mode, the power source unit 95 (the switch unit 98) still supplies power to each of the operation input detection units during the power saving mode as well.

The communication unit 94, which is an operation input detection unit, generates an interruption upon receiving image data or the like from the external computer 200, and inputs the interruption to the power source unit 95 (the interruption A in FIG. 10). The touch panel unit 12 also generates an interruption in response to a touch operation by the user, and inputs the interruption to the power source unit 95 (the interruption B in FIG. 10). The operation panel 1*b* may also generate an interruption whenever any of the hard keys is pressed, and may input the interruption to the power source unit 95. The insertion/removal detection sensor 16*s* also generates an interruption, upon detecting removal or attachment due to paper supply or replacement, and inputs the interruption to the power source unit 95 (the interruption C in FIG. 10). The cover open/close detection sensor 1*fs* also generates an interruption, upon detecting operation (opening/closing) of the cover of a chassis for maintenance, for replacement of consumed goods, or for handling a paper jam, and inputs the interruption to the power source unit 95 (the interruption D in FIG. 10). The open/close detection sensor 1*cs* (the interruption E in FIG. 10), which detects the raising or lowering of the document cover 1*a*, also generates an interruption upon detecting an operation of the document cover 1*a* (the placing of a document thereon or raising or lowering thereof) for copying or the like, and inputs the interruption to the power source unit 95.

When there is an input (interruption) from each of the operation input detection units, the power source unit 95 restores the supply of power to the main control unit 9 and the like, and causes the multifunctional peripheral 100 to return from the power saving mode to the normal mode.

(Flow of the Phase Correction Control for Each of the Polygon Mirrors 6Bk-6C During the Normal Mode)

Figure 11:
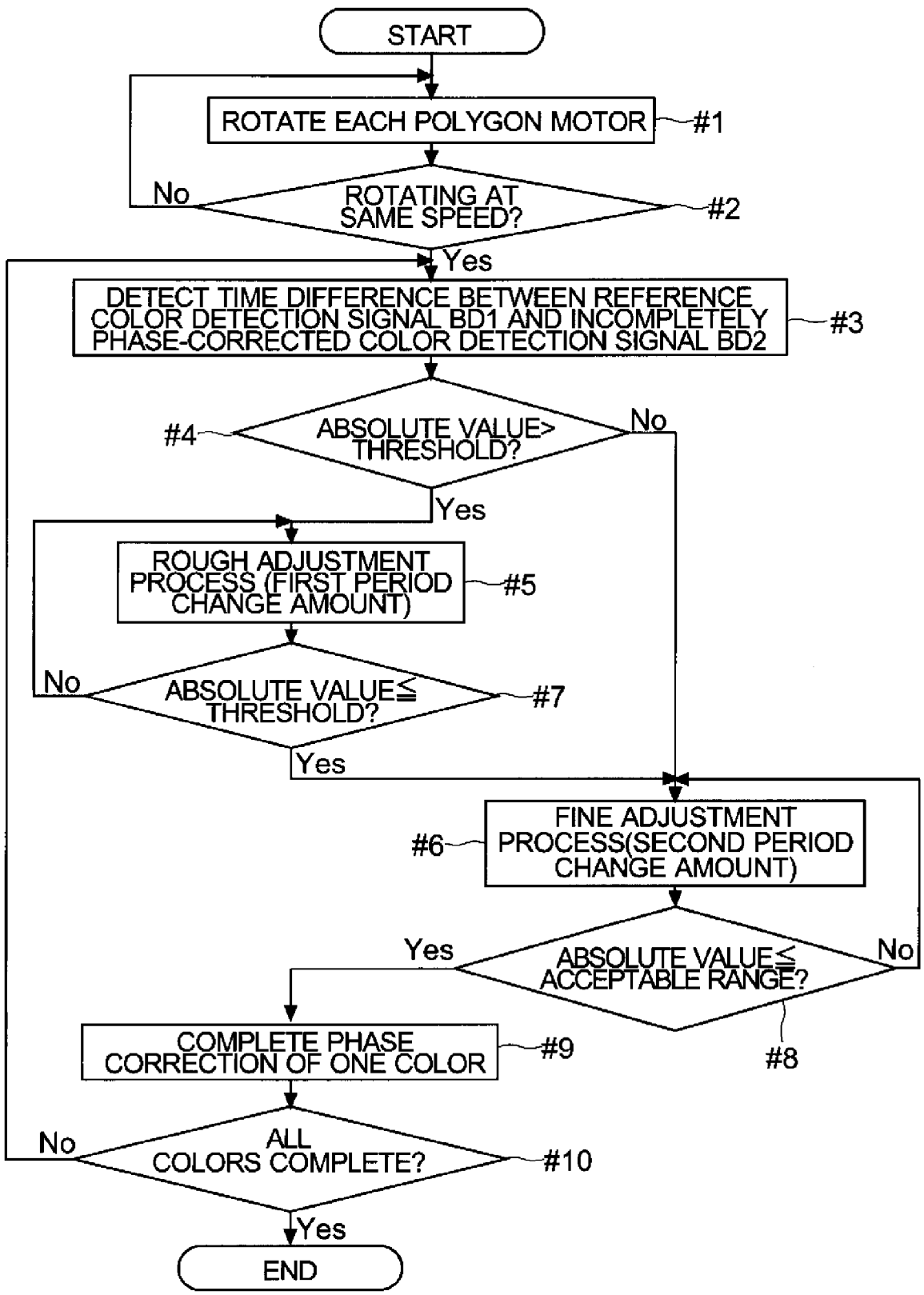
FIG. 11 is a flow chart for illustrating one example of a flow for a phase correction control of each of the polygon mirrors during a normal mode.
Figure 12:
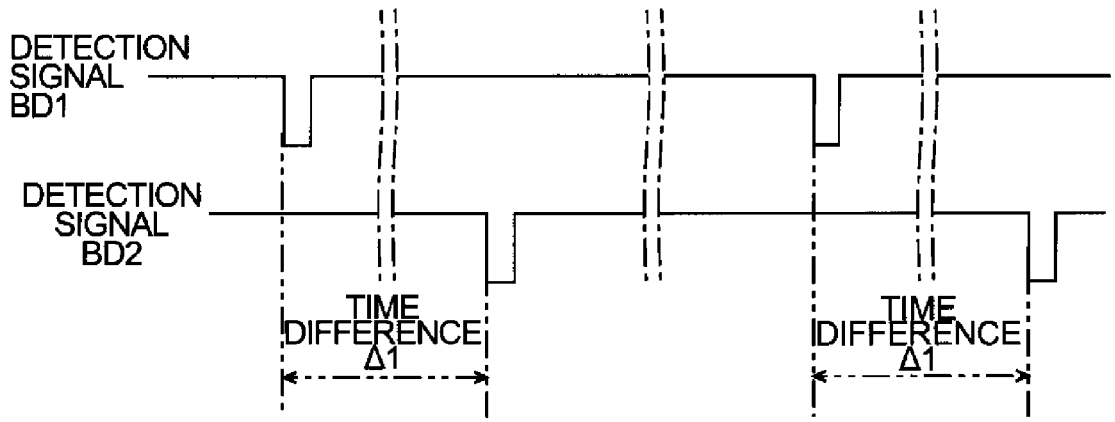
FIG. 12 is a timing chart for illustrating one example of a detection signal outputted by the light-receiving unit before the start of phase correction.
Figure 13:
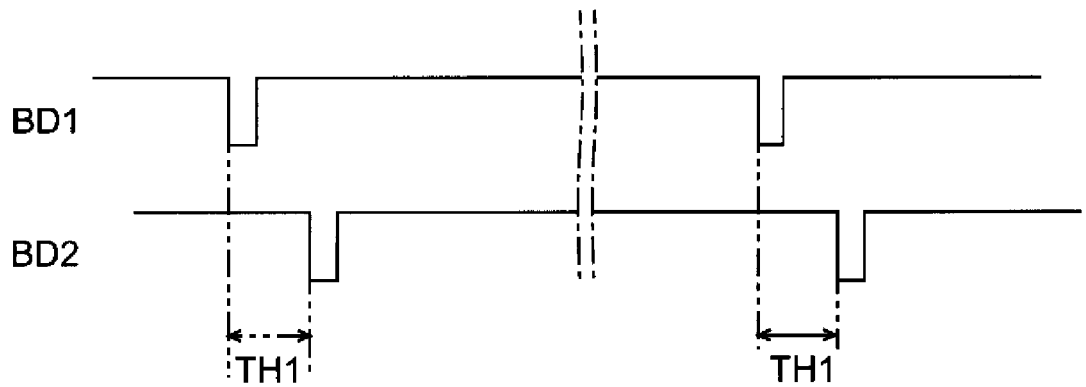
FIG. 13 is a timing chart for illustrating one example of a detection signal outputted by the light-receiving unit during phase correction control.
Figure 14:
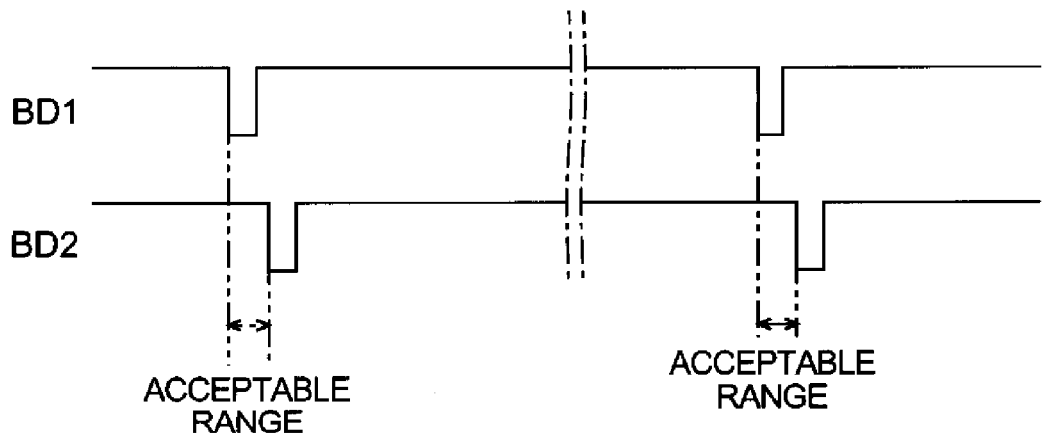
FIG. 14 is a timing chart for illustrating one example of a detection signal outputted by the light-receiving unit after the completion of phase correction.

The description shall now relate to the flow of the phase correction control for each of the polygon mirrors 6Bk-6C during the normal mode of the multifunctional peripheral 100 of the present embodiment, with reference to FIGS. 11 to 14. FIG. 11 is a flow chart for illustrating one example of the flow for the phase correction control of each of the polygon mirrors 6Bk-6C during the normal mode. FIG. 12 is a timing chart for illustrating one example of a detection signal outputted by the light-receiving units 8 before the start of phase correction. FIG. 13 is a timing chart for illustrating one example of the detection signal outputted by the light-receiving units 8 during the phase correction control. FIG. 14 is a timing chart for illustrating one example of the detection signal outputted by the light-receiving units 8 after the completion of the phase correction.

In the description below, the description relates to an example in which black serves as the reference color, and the phases of the polygon mirrors 6Y, 6M, 6C (the polygon motors 7Y, 7M, 7C) for the other colors (the colors targeted for phase correction, more specifically, yellow, magenta, and cyan) are matched to the phase of the polygon mirror 6Bk (the polygon motor 7Bk) for the reference color. The reference color may, however, be any one of the four colors.

The description shall firstly relate to the phase correction control for each of the polygon mirrors 6Bk-6C during the normal mode. The "start" in FIG. 11 is a point in time at which a print job is started in the normal mode in response to the receipt of pressing down of the start key 14 on the operation panel 1*b* or of printing data from the computer 200.

Upon completion of the print job, each of the polygon motors 7Bk-7C is stopped. For this reason, the phase correction control of each of the polygon mirrors 6Bk-6C is carried out at the start time of each print job. When print jobs are being continuously executed, each of the polygon motors 7Bk-7C need not be stopped. For this reason, when the print jobs are being continuously carried out, the phase correction control for each of the polygon mirrors 6Bk-6C may also be carried out only before the first of the print jobs is started.

At the start of a print job, the engine control unit 90 causes each of the polygon motors 7Bk-7C to rotate (step #1). More specifically, the engine control unit 90 causes the drive signal generation unit 902 to supply (input) to each of the polygon motors 7Bk-7C a drive signal of a predetermined reference period (frequency). Then, the engine control unit 90 checks whether or not the polygon motors 7Bk-7C are in a state of rotating at the same speed (step #2). More specifically, for example, the engine control unit 90 checks whether or not the synchronization signal is being outputted to the drive signal generation unit 902 from all of the polygon motors 7.

In the event that each of the polygon motors 7Bk-7C is not rotating at the same speed ("No" in step #2), the flow returns to step #1. On the other hand, when each of the polygon motors 7Bk-7C is in a state of rotating at the same speed ("Yes" in step #2), the engine control unit 90 detects and measures a time difference $\Delta 1$ between a detection signal BD1 detected by the light-receiving unit 8 for the reference color (for example, black) and a detection signal BD2 detected by a light-receiving unit 8 for a color which is later to undergo phase correction, from among those colors that have not yet undergone phase correction (step #3).

The description now relates to the detection of the time difference $\Delta 1$ prior to the start of phase correction, with reference to FIGS. 12 to 14. Firstly, in association with the completion of a print job, each of the polygon motors 7Bk-7C is stopped. The phase of each of the polygon mirrors 6Bk-6C (each of the polygon motors 7Bk-7C) upon being stopped is not always constant, and in some cases they are stopped while in respectively different states. Also, even though each of the polygon motors 7Bk-7C first begins to rotate at the same time, in some cases the phase differences when each of the polygon motors 7Bk-7C reaches a state of rotating at the same speed are also respectively different, due in part to differences in the properties thereof.

Herein, in the multifunctional peripheral 100 of the present embodiment, there is only one correction current supply unit 51 provided. The correction current supply unit 51, during the scanning and exposure of a single line, changes the magnitude of the currents so as to be the same, and supplies currents of the same magnitude to each of the laser-light-emitting units 5Bk-5C. However, when there is a large shift in the phases of each of the polygon mirrors 6Bk-6C (each of the polygon motors 7Bk-7C), the scanning positions of the laser beams directed to the photosensitive drums 22 at the same point in time are far apart. For example, it is sometimes the case that although a central portion of a photosensitive drum 22 in the axial direction is being scanned with a certain color, the end parts of the photosensitive drum 22 in the axial direction are being scanned with another color. When this occurs, the laser beam can no longer be appropriately corrected in accordance with the scanning position of the photosensitive drum 22 (the scanning position in the main scanning direction). It is also sometimes the case that there is a variation in the write position for the first pixel of a line when there is a large variation in the phases of each of the polygon mirrors 6Bk-6C (each of the polygon motors 7Bk-7C).

Thus, in the present embodiment, each of the polygon mirrors 6Bk-6C (each of the polygon motors 7Bk-7C) undergoes phase correction to bring the phase differences for each of the polygon mirrors 6Bk-6C within an acceptable range. In the multifunctional peripheral 100 of the present embodiment, the phase correction is carried out on the basis of the detection signal of the laser beams by each of the light-receiving units 8Bk-8C.

Firstly, as illustrated in FIGS. 12 to 14, in the multifunctional peripheral 100 of the present embodiment, each of the light-receiving units 8Bk-8C produces an output "High" in a state where a laser beam is not being irradiated. In a state where a laser beam is being irradiated, each of the light-receiving units 8Bk-8C produces an output "Low." In other words, the output of each of the light-receiving units 8Bk-8C falls when irradiation with a laser beam is detected. The positive and negative of this logic may also be reversed.

The detection signal BD1 in FIGS. 12 to 14 illustrates one example of the waveform of a signal outputted by a light-receiving unit 8 of the reference color (for example, black). Meanwhile, the detection signal BD2 illustrates one example of the waveform of a signal outputted by a light-receiving unit 8 of a color targeted for phase correction (yellow, cyan, or magenta).

As illustrated in FIG. 12, at the start of the phase correction, the engine control unit 90 detects (measures) the time difference $\Delta 1$ between the change points (falling edges) of the detection signal BD1 of the reference color and the detection signal BD2 of the color targeted for phase correction (step #3). For example, the time difference $\Delta 1$ is measured by an engine CPU 903 or timing unit 904 provided to the engine control unit 90. In the present embodiment, the absolute value of this time difference $\Delta 1$ is brought into the acceptable range (for example, several $\mu$s, or about 1-3 $\mu$s) to thereby bring the phase difference into an acceptable range.

Next, the engine control unit 90 checks whether or not the absolute value of the measured time difference $\Delta 1$ is greater than a predetermined threshold TH1 (for example, about 10-20 $\mu$s) (step #4). The threshold TH1 is a threshold for determining whether to perform a rough adjustment process or to perform a fine adjustment process (described below), and the value can be determined as desired. A closer proximity of the threshold TH1, which is greater than the predetermined acceptable range, to the predetermined acceptable range correlates to a shorter time needed for the phase correction.

In the event that the absolute value is greater than the predetermined threshold TH1 ("Yes" in step #4), the engine control unit 90 uses the rough adjustment process to shrink the phase difference between the polygon mirror 6 for the reference color (the polygon motor 7Bk) and the polygon mirrors 6Y, 6M, 6C (polygon motors 7Y, 7M, 7C) for the colors targeted for phase correction (step #5). By contrast, when the absolute value is not greater than the predetermined threshold TH1 ("No" in step #4), the engine control unit 90 uses the fine adjustment process to shrink the phase difference (time difference $\Delta 1$) between the polygon mirror 6Bk for the reference color and the polygon mirrors 6Y, 6M, 6C for the colors targeted for phase correction (step #6).

The description now relates to the rough adjustment process and the fine adjustment process. Firstly, in both the rough adjustment process and the fine adjustment process, the engine control unit 90 adjusts the phase (frequency) of the drive signal supplied to the polygon motors 7Y, 7M, 7C for the colors targeted for phase correction, and shrinks the time difference $\Delta 1$ between the detection signal BD1 and the detection signal BD2 (the phase difference of the polygon mirrors 6).

More specifically, when the phase of the detection signal BD2 is delayed relative to the detection signal BD1 for the reference color, the engine control unit 90 causes the drive signal generation unit 902 to make the period of the drive signal for the colors targeted for phase correction shorter than the reference period. The engine control unit 90 then causes a drive signal of a shorter period than the reference period to be supplied to the polygon motors 7Y, 7M, 7C for the colors targeted for phase correction, and advances the phase of the detection signal BD2.

By contrast, when the phase of the detection signal BD2 is advanced relative to the detection signal BD1 for the reference color, the engine control unit 90 causes the drive signal generation unit 902 to make the period of the drive signal for the colors targeted for phase correction shorter than the reference period. The engine control unit 90 then causes a drive signal of a longer period than the reference period to be supplied to the polygon motors 7Y, 7M, 7C for the colors targeted for phase correction, and delays the phase of the detection signal BD2.

Herein, the change amount relative to the reference period is different for the rough adjustment process and the fine adjustment process. The period change amount in the rough adjustment process (a first period change amount) represents a greater period change amount from the reference period than during the fine adjustment process. By contrast, the period change amount in the fine adjustment process (a second period change amount) represents a smaller period change amount from the reference period than during the rough adjustment process.

The first period change amount and the second period change amount are within a range where a loss of control of the rotational speed of the polygon motors 7 will not occur, and are change amounts that are arbitrarily determined as desired. For example, when the period change amount where a loss of control of the rotational speed of the polygon motors 7 will not occur (desynchronization will not occur) is up to about 0.5% of the period of the drive signal (the reference period), then the first period change amount would be about 0.5% of the period of the drive signal for the polygon motors 7 (the reference period), and the second period change amount would be about 0.2-0.4% (more specifically, about 0.2%) of the period of the drive signal for the polygon motors 7 (the reference period).

In the rough adjustment process, the engine control unit 90 causes the drive signal generation unit 902 to generate a drive signal with which the period of the drive signal for the colors targeted for phase correction has been shorted or lengthened by as much as the first period change amount, depending on whether the phase is to be advanced or delayed. By contrast, in the fine adjustment process, the engine control unit 90 causes the drive signal generation unit 902 to generate a drive signal with which the period of the drive signal for the colors targeted for phase correction has been shorted or lengthened by as much as the second period change amount, depending on whether the phase is to be advanced or delayed. Thus, the rough adjustment process is able to eliminate the time difference $\Delta 1$ between the detection signal BD1 and the detection signal BD2 (is able to bring the phases of the different polygon mirrors 6 closer together) more rapidly than the fine adjustment process.

Therefore, when the rough adjustment process is to be carried out (step #5), the engine control unit 90 checks whether or not the absolute value of the time difference $\Delta 1$ between the detection signal BD1 and the detection signal BD2 has reached the predetermined threshold TH1 or lower every instance when the detection signal BD1 and the detection signal BD2 are inputted (step #7).

In the event that the absolute value is greater than the threshold TH1 ("No" in step #7), the engine control unit 90 continues to use the rough adjustment process to eliminate the time difference Δ1 (the flow returns to step #5). On the other hand, when the absolute value has reached the threshold TH1 or lower ("Yes" in step #7), the engine control unit 90 carries out the fine adjustment process (step #6).

When a transition is made to a stage where the fine adjustment process is to be carried out (step #6), the engine control unit 90 checks whether or not the absolute value of the time difference Δ1 between the detection signal BD1 and the detection signal BD2 has reached the predetermined acceptable range or lower (has fallen into the acceptable range) every instance when the detection signal BD1 and the detection signal BD2 are inputted (step #8).

As illustrated in FIG. 13, the fine adjustment process is performed when the absolute value of the time difference Δ1 between the detection signal BD1 and the detection signal BD2 reaches the threshold TH1 or lower. The fine adjustment process, as illustrated in FIG. 14, causes the absolute value of the time difference Δ1 between the detection signal BD1 and the detection signal BD2 to fall within the acceptable range.

In the event that the time difference Δ1 has not reached the acceptable range or lower ("No" in step #8), the engine control unit 90 continues to use the fine adjustment process to eliminate the time difference Δ1 (the flow returns to step #6). By contrast, when the time difference Δ1 has reached the acceptable range or lower ("Yes" in step #8), the engine control unit 90 has completed the phase correction for the one color (step #9). The engine control unit 90 makes the drive signal generation unit 902 cause the period of the drive signal for the polygon motor 7 of the color targeted for phase correction for which phase correction has been completed to return to the reference period. Thus, the polygon mirror 6Bk (polygon motor 7Bk) of the reference color and the polygon mirror 6 (polygon motor 7) of the color for which the phase has been corrected continue to rotate at substantially the same phase and the same rotational speed.

In this manner, because the fine adjustment process ultimately brings the time difference Δ1 within the acceptable range, the phase correction is performed with a period change amount (increment size) that is shorter (smaller) than in the rough adjustment process. As such, the phase difference between the polygon mirror 6Bk of the reference color and the polygon mirrors 6Y, 6M, 6C of the colors targeted for phase correction can be accurately corrected.

After step #9, the engine control unit 90 checks whether correction has been completed for all of the polygon mirrors 6Y, 6M, 6C of the colors targeted for phase correction (step #10). In the event that correction has been completed ("Yes" in step #10), the flow is terminated, and in the event that correction has not been completed ("No" in step #10), the flow returns step #3. The correction of the phase difference for the colors targeted for phase correction may also be carried out for a plurality of colors in parallel (at the same time).

(Flow of the Phase Correction Control when the Main Power Source is Turned on or at the Time of Return to the Normal Mode)

Figure 15:
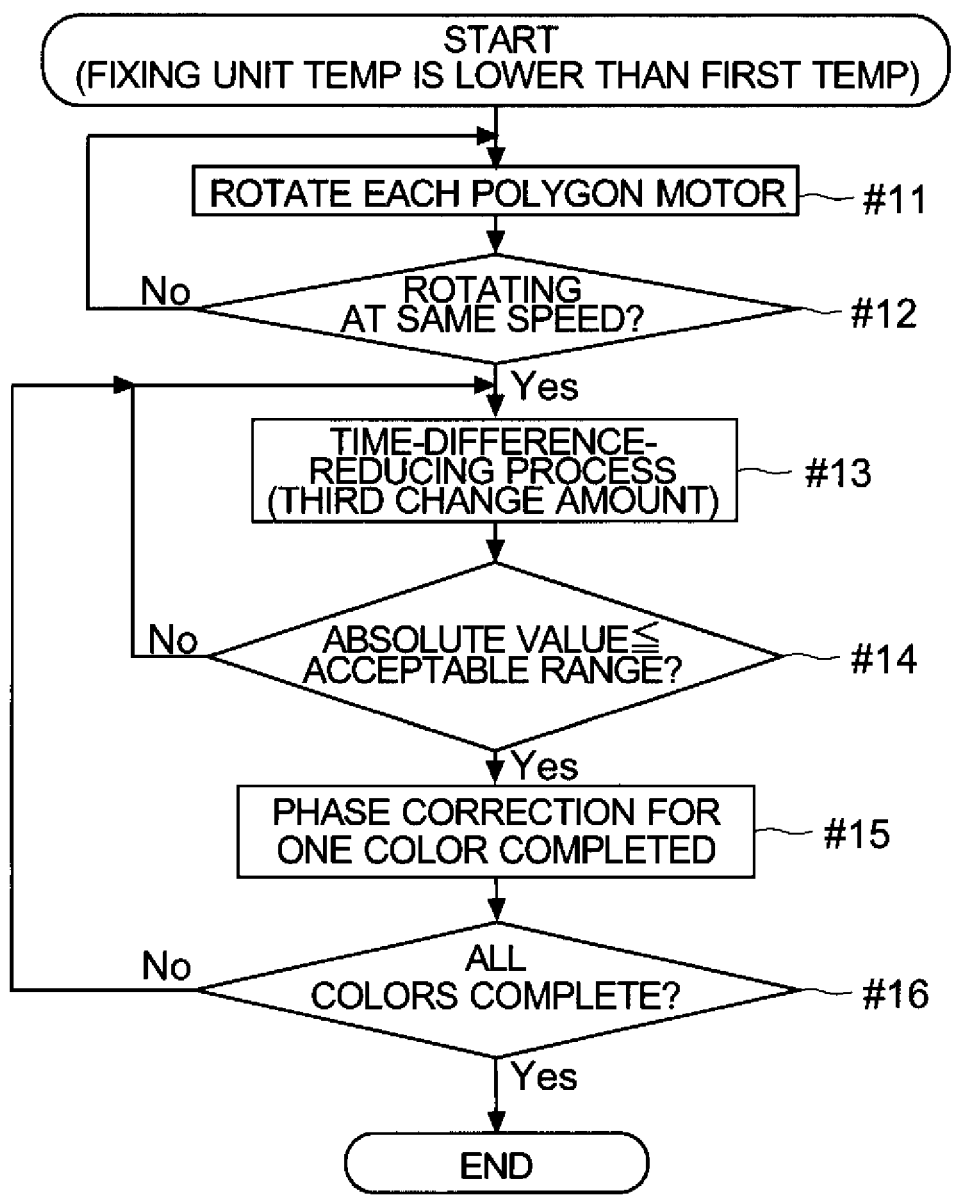
FIG. 15 is a flow chart illustrating one example of a flow for a phase correction control of each of the polygon mirrors when a main power source is turned on or at the time of return to the normal mode.
Figure 16:
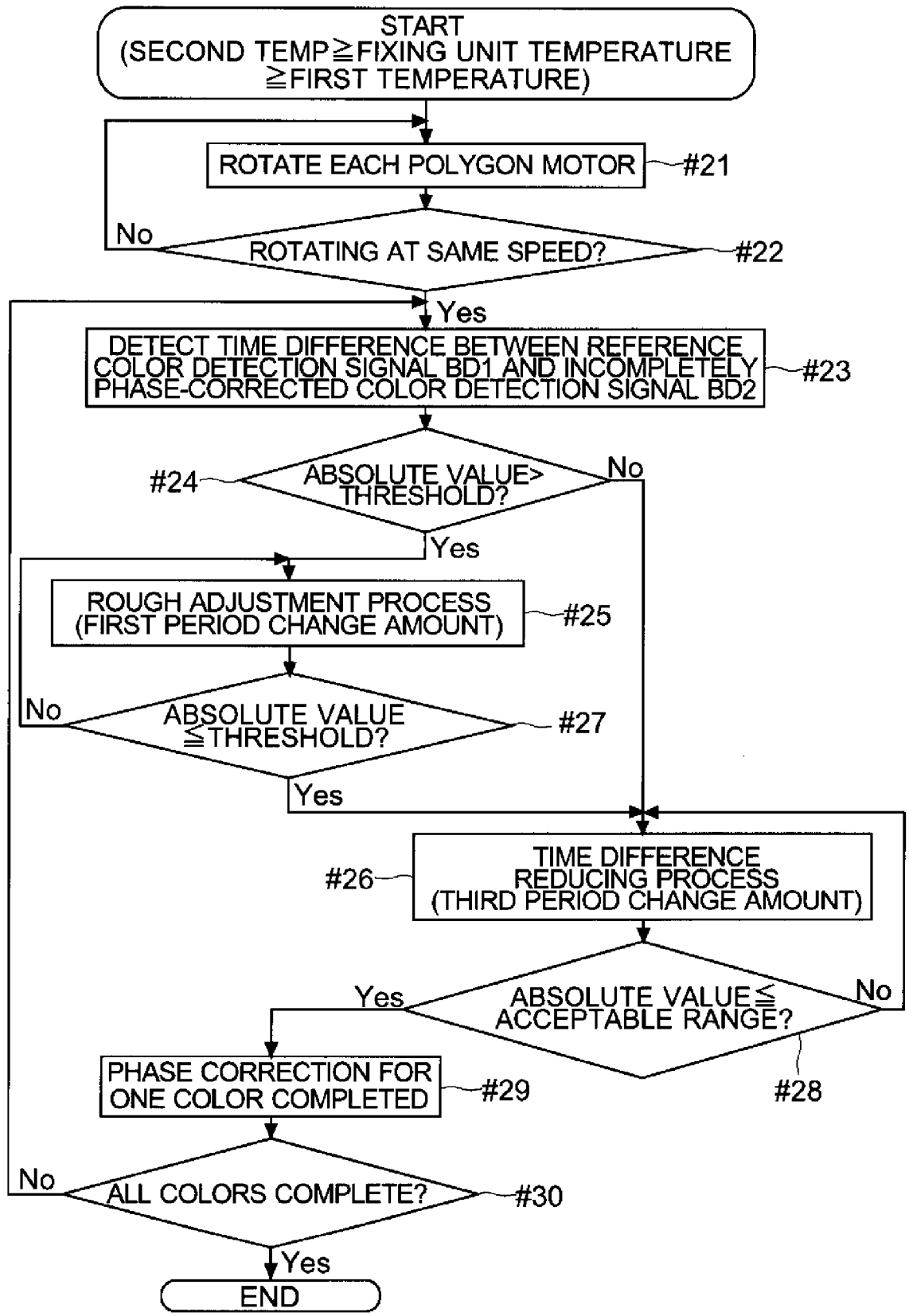
FIG. 16 is a flow chart illustrating one example of a flow for a phase correction control of each of the polygon mirrors when a main power source is turned on or at the time of return to the normal mode.

The description shall now relate to the flow of the phase correction control for each of the polygon mirrors 6Bk-6C when the main power source is turned on or at the time of return to the normal mode in the multifunctional peripheral 100 of the present embodiment, with reference to FIGS. 15 and 16. FIGS. 15 and 16 are flow charts illustrating one example of a flow for the phase correction control of each of the polygon mirrors 6Bk-6C when the main power source is turned on or at the time of return to the normal mode.

When the main power source is turned on or at the time of return to the normal mode, a variety of processes are performed to bring the multifunctional peripheral 100 to a state where printing is possible, such as start-up of the main control unit 9, start-up of the engine, and increasing the temperature of the fixing unit 3b.

However, for example, when the main power source is turned on, the phase correction of each of the polygon mirrors 6Bk-6C is in some cases performed as an initial operation. It is necessary for the phase correction for each of the polygon mirrors 6Bk-6C to be performed in a case where the return to the normal mode is based on a print job, such as a case where the return from the power saving mode to the normal mode is in response to the receipt of the printing data from the computer 200, or a case where a print command has been made to the operation panel 1b in association with the return from the power saving mode to the normal mode.

When the main power source is turned on or at the time of the return to the normal mode, the warming of the fixing unit 3b (warm-up of the fixing unit 3b) is one process that requires time in order to reach a state where printing is possible. In general, a temperature detector is provided in order to detect the temperature of the fixing unit 3b (for example, the temperature of the heating roller 37). In the multifunctional peripheral 100 of the present embodiment, too, a temperature sensor 39 is provided (see FIG. 1). For example, the temperature sensor 39 includes a thermistor, and the voltage outputted is different depending on the temperature. The output of the temperature sensor 39 is then inputted to the engine control unit 90 (see FIG. 4).

The engine control unit 90 recognizes the temperature of the fixing unit 3b on the basis of the output of the temperature sensor 39. In the normal mode, the engine control unit 90 turns on/off the distribution of power to a heater built into the heating roller 37, to maintain the temperature of the fixing unit 3b at a temperature where fixing is possible (a fixing control temperature, for example, about 170-200° C., varies depending on the type of machine).

In the "off" state of the main power source or during the power saving mode, no power is supplied to the heater for warming up the heating roller 37 of the fixing unit 3b. As such, the result is that the fixing unit 3b cools down entirely to room temperature. A duration of about several seconds to several tens of seconds is in some cases needed in order to warm (the heating roller 37 of) the fixing unit 3b from the entirely cooled-down state to the fixing control temperature. The time needed to warm up to the fixing control temperature may differ depending on the heater output, the heating control temperature, or the material properties of the member of the fixing unit 3b.

As such, because time is needed in order to warm up the fixing unit 3b, in some cases the phase correction of each of the polygon mirrors 6Bk-6C (each of the polygon motors 7Bk-7C) need not be the briefest possible (need not be rushed) when the main power source is turned on or at the time of return to the normal mode.

Thus, in the multifunctional peripheral 100 of the present embodiment, when the phase correction of each of the polygon mirrors 6Bk-6C (each of the polygon motors 7Bk-7C) need not be the briefest possible when the main power source is turned on or at the time of return to the normal mode, then a base period of the drive signal is changed by a period change amount even lesser than that of the fine adjustment process (by a third period change amount) to perform phase correction.

The description shall now, with reference to FIG. 15, first relate to the flow of the phase correction control for each of the polygon mirrors 6Bk-6C when the temperature of the fixing unit 3b has dropped, such as at the warm-up start time for the fixing unit 3b, when the main power source is turned on or at the time of return to the normal mode.

Firstly, at a time such as the warm-up start time for the fixing unit 3b when the main power source is turned on or at the time of return to the normal mode, the engine control unit 90 ascertains whether or not the temperature of the fixing unit 3b has dropped by whether or not the temperature of the fixing unit 3b falls short of a predetermined first temperature, on the basis of the output of the temperature sensor 39. The first temperature can be determined arbitrarily as desired, but one example would be several tens of degrees Celsius or lower, more specifically, 40° C. or lower. In other words, the first temperature is a temperature at which the fixing unit 3b has cooled to an extent that the phase correction can be completed before the warm-up of the fixing unit 3b is completed even when the phase correction is carried out only with an ultrafine adjustment process.

When the phase correction control for each of the polygon mirrors 6Bk-6C is carried out when the main power source is turned on or at the time of return to the normal mode, the engine control unit 90 recognizes whether the temperature of the fixing unit 3b has fallen short of the first temperature on the basis of the output of the temperature sensor 39.

The "start" in FIG. 15 is a point in time, such as when the main power source is turned on, the time of return to the normal mode, or the warm-up start time for the fixing unit 3b, where the temperature of the fixing unit 3b has fallen short of the first temperature and where the phase correction of each of the polygon mirrors 6Bk-6C (each of the polygon motors 7Bk-7C) begins when the temperature of the fixing unit 3b has dropped, on the basis of the output of the temperature sensor 39.

Firstly, the engine control unit 90 causes each of the polygon motors 7Bk-7C to rotate (step #11). Then, the engine control unit 90 checks whether each of the polygon motors 7Bk-7C is in a state of rotating at the same speed (step #12). Step #11 and step #12 are similar to during the normal mode, and a more detailed description thereof has been omitted (see FIG. 11).

When each of the polygon motors 7Bk-7C is not yet rotating at the same speed ("No" in step #12), the flow returns to step #11. On the other hand, when each of the polygon motors 7Bk-7C is in a state of rotating at the same speed ("Yes" in step #12), the engine control unit 90 uses the ultrafine adjustment process to shrink the phase difference between the polygon mirror 6Bk (polygon motor 7Bk) of the reference color and the polygon mirror 6Y, 6M, 6C (polygon motor 7Y, 7M, 7C) of one color from among those colors that have not yet undergone phase correction (step #13).

The description now relates to the ultrafine adjustment process. In the ultrafine adjustment process, the period change amount from the reference period is made to be the third period change amount, which is even lesser than that during the fine adjustment process (than the second period change amount). The third period change amount, too, is within a range where a loss of control of the rotational speed of the polygon motors 7 will not occur, and is a change amount that is arbitrarily determined as desired. One example of the third period change amount would be about 0.1% of the reference period.

In the ultrafine adjustment process, the engine control unit 90 causes the drive signal generation unit 902 to generate a drive signal with which the period of the drive signal for the colors targeted for phase correction has been shorted or lengthened by as much as the third period change amount, depending on whether the phase is to be advanced or delayed. This makes it possible to bring the time difference Δ1 between the detection signal BD1 and the detection signal BD2 within the acceptable range in an even finer manner than the fine adjustment process (makes it possible to bring the phases of each of the polygon mirrors 6Bk-6C closer to each other in an even finer manner).

The engine control unit 90 then checks whether or not (the absolute value) of the time difference Δ1 between the detection signal BD1 and the detection signal BD2 has reached the predetermined acceptable range or lower (has fallen into the acceptable range) every instance when the detection signal BD1 and the detection signal BD2 are inputted (step #14).

In the event that the time difference Δ1 has not fallen into the acceptable range ("No" in step #14), the engine control unit 90 continues to use the ultrafine adjustment process to eliminate the time difference Δ1 (the flow returns to step #13). However, when time difference Δ1 has reached the acceptable range or lower ("Yes" in step #14), the engine control unit 90 has completed the phase correction for one color (step #15). At such a time, the engine control unit 90 makes the drive signal generation unit 902 cause the period of the drive signal for the polygon motor 7 of the color targeted for phase correction for which phase correction has been completed to return to the reference period. Thus, the polygon mirror 6Bk (polygon motor 7Bk) of the reference color and the polygon mirrors 6Y, 6M, 6C (polygon motors 7Y, 7M, 7C) of the colors targeted for phase correction continue to rotate at substantially the same phase and the same rotational speed.

In this manner, because the ultrafine adjustment process ultimately brings the time difference Δ1 within the acceptable range, the phase correction is performed with an increment size that is shorter (smaller) than in the fine adjustment process. As such, the phase difference between the polygon mirror 6Bk (polygon motor 7Bk) of the reference color and the polygon mirrors 6Y, 6M, 6C (polygon motors 7Y, 7M, 7C) of the colors targeted for phase correction can be accurately corrected.

After step #15, the engine control unit 90 checks whether correction has been completed for all of the polygon mirrors 6Y, 6M, 6C of the colors targeted for phase correction (step #16). In the event that correction has been completed ("Yes" in step #16), the flow is terminated, and when correction has not been completed ("No" in step #16), the flow returns step #13.

The description shall now, with reference to FIG. 16, relate to the flow of the phase correction control for each of the polygon mirrors 6Bk-6C when the temperature of the fixing unit 3b has decreased by a certain degree at such a time as when the main power source is turned on, at the time of return to the normal mode, or at the warm-up start time for the fixing unit 3b.

Firstly, at a time such as the warm-up start time for the fixing unit 3b when the main power source is turned on or at the time of return to the normal mode, the engine control unit 90 ascertains whether or not the temperature of the fixing unit 3b has decreased by a certain degree, by whether or not the temperature of the fixing unit 3b is not less than the predetermined first temperature and not greater than a second temperature, on the basis of the output of the temperature sensor 39. The second temperature can be determined arbitrarily as desired, but one example would be one hundred and several tens of degrees Celsius. In other words, the question of whether or not the phase correction can be completed before the warm-up of the fixing unit 3b is completed when the ultrafine adjustment process is to be performed is ascertained using the first temperature and the second temperature.

When the fixing unit 3b surpasses the second temperature, the same process as the phase correction control for each of the polygon mirrors 6Bk-6C during the normal mode illustrated in FIG. 11 (a phase correction combining both the rough adjustment process and the fine adjustment process) is performed (see FIG. 11).

The "start" in FIG. 16 is a point in time, such as the warm-up start time for the fixing unit 3*b* when the main power source is turned on or the time of return to the normal mode, where the engine control unit 90 starts the phase correction for the polygon mirrors 6Y, 6M, 6C for the colors targeted for phase correction, upon ascertaining that the temperature of the fixing unit 3*b* is not less than the predetermined first temperature and not greater than the second temperature (that the temperature of the fixing unit 3*b* has dropped by a certain degree), on the basis of the output of the temperature sensor 39.

Firstly, the engine control unit 90 causes each of the polygon motors 7Bk-7C to rotate (step #21). Then, the engine control unit 90 checks whether or not the polygon motors 7Bk-7C are in a state of rotating at the same speed (step #22). Step #21 and step #22 are similar to during the normal mode, and a more detailed description thereof has been omitted (see FIG. 11).

In the event that each of the polygon motors 7Bk-7C is not yet rotating at the same speed ("No" in step #22), the flow returns to step #21. On the other hand, when each of the polygon motors 7Bk-7C is in a state of rotating at the same speed ("Yes" in step #22), the engine control unit 90 detects the time difference $\Delta 1$ between the detection signal BD1 detected by the light-receiving unit 8 for the reference color and the detection signal BD2 detected by the light-receiving unit 8 for a color which is later to undergo phase correction, from among those colors that have not yet undergone phase correction (step #23). More specifically, at the start of the phase correction, the engine control unit 90 detects (measures) the time difference $\Delta 1$ between the change points (falling edges) of the detection signal BD1 of the reference color and the detection signal BD2 of the color targeted for phase correction (step #23).

The approach to the phase correction is similar to the phase correction during the normal mode as described with reference to FIGS. 12 to 14, and thus a description thereof has been omitted.

Next, the engine control unit 90 checks whether or not the absolute value of the measured time difference $\Delta 1$ is greater than the predetermined threshold TH1 (for example, about 10-20 μs) (step #24). In the effect that the absolute value is greater than the predetermined threshold TH1 ("Yes" in step #24), the engine control unit 90 uses the rough adjustment process to shrink the phase difference between the polygon mirror 6Bk (polygon motor 7Bk) of the reference color and the polygon mirror 6Y, 6M, 6C (polygon motor 7Y, 7M, 7C) of any of the colors targeted for phase correction (step #25). On the other hand, when the absolute value is not greater than the predetermined threshold TH1 ("No" in step #24), the engine control unit 90 uses the ultrafine adjustment process to shrink the phase difference between the polygon mirrors 6 (polygon motors 7) of the reference color and of the color targeted for phase correction (step #26).

In other words, when the main power source is turned on or at the time of return to the normal mode, when the engine control unit 90 ascertains that the temperature of the fixing unit 3*b* has dropped by a certain degree on the basis of the output of the temperature sensor 39 and of the predetermined first temperature and second temperature, then the fine control process during the normal mode is changed and the ultrafine adjustment process using the third period change amount is carried out.

When the rough adjustment process is being carried out (step #25), the engine control unit 90 checks whether or not the absolute value of the time difference $\Delta 1$ between the detection signal BD1 and the detection signal BD2 has reached the predetermined threshold TH1 or lower, at every instance when the detection signal BD1 and the detection signal BD2 are inputted (step #27). Step #27 to step #30 are similar to step #7 to step #10 during the phase correction in the normal mode as described with reference to FIG. 11, and it is possible to call upon the description thereof. A more detailed description has thus been omitted.

The image-forming apparatus of the present embodiment (for example, the multifunctional peripheral 100) thus includes a plurality of photosensitive drums 22 provided for every color (22Bk-22C), a plurality of laser scanning units 40 (laser scanning units 40*b*k-40C) for scanning and exposing the corresponding photosensitive drum 22 (22Bk-22C) and forming a toner image of respectively different colors, each of the laser scanning units 40 including a laser-light-emitting unit 5 for switching a laser beam on and off in accordance with image data, a polygon mirror 6 for reflecting, while rotating, the laser beam emitted by the laser-light-emitting unit 5 and scanning and exposing the corresponding photosensitive drum 22 (22Bk-2CC), the polygon mirror having a plurality of reflective surfaces, a polygon motor 7 for rotating the polygon mirror 6, the rotational speed of the polygon motor changing in accordance with the frequency of a provided drive signal, and a light-receiving unit 8 for outputting a detection signal having an output value which changes when the laser beam is received, the light-receiving unit being provided within a range in which the laser beam is irradiated by the polygon mirror 6, and a motor control unit (engine control unit 90) for providing the drive signal of a predetermined base period to the polygon motors 7 and causing the polygon motors 7 to rotate such that each of the polygon motors 7 (polygon motors 7Bk-7C) rotates at the same speed, detecting the time difference $\Delta 1$ between a change point of the detection signal BD1 of the laser scanning unit of a reference color (the laser scanning unit 40Bk) and the change points of the detection signals BD2 of the laser scanning units of colors targeted for phase correction other than the reference color (laser scanning units 40Y, 40M, 40C), and, when the absolute value of the time difference $\Delta 1$ is greater than a predetermined threshold TH1, carrying out a rough adjustment process in which the drive signal with which the base period has been shorted or lengthened by a first period change amount causes the polygon motors of the colors targeted for phase correction (polygon motors 7Y, 7M, 7C) to rotate and causes the time difference $\Delta 1$ to decrease, or, when the absolute value is not greater than the threshold TH1, carrying out a fine adjustment process in which, until the time difference $\Delta 1$ falls within a predetermined acceptable range, the drive signal with which the base period has been shortened or lengthened by a second period change amount smaller than the first period change amount with respect to the base period causes the polygon motors of the colors targeted for phase correction (the polygon motors 7Y, 7M, 7C) to rotate and causes the time difference $\Delta 1$ to decrease.

Thus, the phase differences (time difference $\Delta 1$) between the polygon mirrors 6 of the reference color and of the colors targeted for phase correction are swiftly and rapidly brought closer to each other by the rough adjustment process, and thereafter the phase differences (time difference $\Delta 1$) between the polygon mirrors 6 of the reference color and of the colors targeted for phase correction are accurately and precisely corrected (adjusted) by the fine adjustment process. As such, the time needed to correct the phase differences can successfully be curtailed as much as possible, and yet the phase differences can still be corrected accurately.

The image-forming apparatus (for example, the multifunctional peripheral 100) also includes one correction current supply unit 51 for changing, in a similar manner for each of the laser-light-emitting units 5, the current flowing to each of the laser-light-emitting units 5 (laser-light-emitting units 5Bk-5C) in accordance with the scanning position in the main scanning direction, and for changing the light emission level of each of the laser-light-emitting units 5 to correct the difference in energy received by the photosensitive drums 22 (22Bk-22C) in the main scanning direction. In the present disclosure, the phase difference of each of the polygon mirrors 6Bk-6C (each of the polygon motors 7Bk-7C) is adjusted, and all of the plurality of polygon mirrors 6 are made to rotate in synchronization. The scanning and exposure positions of the photosensitive drums 22 are thereby made to be substantially the same position for each color, and accordingly there need be installed only one correction current supply unit 51 for performing the same for the laser-light-emitting units 5 of each color, without the need to provide for every laser-light-emitting unit 5 a current supply unit for performing a correction in which the amount of current flowing to each of the laser-light-emitting units 5Bk-5C is changed dependent on the scanning position. As such, merely providing the single correction current supply unit 51 makes it possible to suitably correct the light emission levels of the laser-light-emitting units 5 and possible to keep low the production costs of the image-forming apparatus.

Among the processes for achieving a state where the image-forming apparatus can be used, the process for warming the fixing unit 3b to a temperature where toner can be fixed (the warm-up process for the fixing unit 3b) in some cases requires a longer time than does the phase difference correction. In other words, sometimes there is no need to attempt to shorten as much as possible the correction of the phase differences. Therefore, the image-forming apparatus of the present embodiment (for example, the multifunctional peripheral 100) includes a transfer unit (the intermediate transfer unit 3a) for transferring while also superimposing a toner image of each color formed on each of the photosensitive drums 22 (22Bk-22C) onto paper, and a fixing unit 3b for fixing the transferred toner image onto the paper with heat, the fixing unit having a built-in heater, when the warm-up for warming the temperature of the fixing unit 3b to the temperature needed in order to fix a toner image is performed, the motor control unit (engine control unit 90) detects the time difference $\Delta 1$ between the change point of the detection signal BD1 of the laser scanning unit of the reference color (the laser scanning unit 40Bk) and the change points of the detection signals BD2 of the laser scanning units of the colors targeted for phase correction (the laser scanning units 40Y, 40M, 40C), carries out the rough adjustment process when the absolute value of the time difference $\Delta 1$ is greater than the threshold TH1, and, after the absolute value has reached the threshold TH1 or lower due to the rough adjustment process, instead of the fine adjustment process, carries out an ultrafine adjustment process in which the drive signal with which the base period has been shortened or lengthened by a third predetermined period change amount is used to cause the polygon motors (the polygon motors 7Y, 7M, 7C) of the colors targeted for phase correction to rotate until the time difference $\Delta 1$ falls within the acceptable range. The third period change amount is a lesser change amount with respect to the base period than is the second period change amount. Thus, in a case where time may be allotted to correct the phase correction, the correction of the phase difference is performed such that the base period is changed by the third period change amount, which has the least change amount, and the time difference $\Delta 1$ falls within the acceptable range. As such, because the phase difference is corrected with a lesser period change amount while consideration is also given to the ability of the polygon motors 7 to track and respond, the phase difference can be corrected accurately.

The image-forming apparatus of the present embodiment (for example, the multifunctional peripheral 100) also includes a temperature sensor 39 for detecting the temperature of the fixing unit 3b. When the temperature detected by the temperature sensor 39 at the start of phase correction is less than a predetermined first temperature, the motor control unit (engine control unit 90) does not perform the rough adjustment process but rather the ultrafine adjustment process until the time difference $\Delta 1$ falls within the acceptable range. The phase difference is thereby corrected with only the ultrafine adjustment process using the third period change amount in a case where time is needed to warm the fixing unit 3b and time may be allotted to phase correction, such as a case where the fixing unit 3b has cooled down entirely. As such, extremely accurate phase correction can be performed.

When the temperature detected by the temperature sensor 39 at the start of phase correction is higher than the predetermined second temperature, the motor control unit (engine control unit 90) does not perform the ultrafine adjustment process but rather causes the time difference $\Delta 1$ to fall within the acceptable range using the rough adjustment process and the fine adjustment process. The second temperature is a higher temperature than the first temperature. Thus, when heat has already been accumulated in the fixing unit 3b and the warming of the fixing unit 3b might be completed in a brief period of time, the phase correction is performed using the rough adjustment process and the fine adjustment process, and phase correction is more rapidly ended.

The first period change amount, the second period change amount, and the third period change amount are change amounts for the drive signal within a range where the rotation of the polygon motors 7 will not be desynchronized. The period change of the drive signal is thereby performed in a range where the polygon motors 7 can be controlled.

The first period change amount is the greatest change amount for the drive signal within a range where the rotation of the polygon motors 7 will not be desynchronized. When the period change amount where a loss of control of the rotational speed of the polygon motors 7 will not occur (desynchronization will not occur) is a range of ±0.5% of the reference period of the drive signal, then the first period change amount would be ±0.5% of the period of the drive signal for the polygon motors 7 (the reference period). This makes it possible for the phase difference to be brought within the threshold as quickly as possible.

Preferably, the absolute value of the second period change amount is not greater than one-half of the absolute value of the first period change amount and the absolute value of the third period change amount is not greater than one-half of the absolute value of the second period change amount. When the first period change amount is ±0.5% (absolute value 0.5%) of the reference period of the drive signal, then the second period change amount is ±0.2% (absolute value 0.2%) of the reference period of the drive signal. When the second period change amount is ±0.2% of the reference period of the drive signal, then the third period change amount is ±0.1% (absolute value 0.1%) of the reference period of the drive signal. Thus, the rotational speeds of the polygon motors can be adequately changed in accordance with each of the period change amounts, and the phase difference can be accurately and quickly corrected.

The foregoing is a description of an embodiment of the present disclosure, but the scope of the present disclosure is not limited thereto, but rather a variety of modifications can be additionally carried out within a scope that does not depart from the spirit of the disclosure.

What is claimed is:

1. An image-forming apparatus, comprising:
a plurality of photosensitive drums provided for every color;
a plurality of laser scanning units for scanning and exposing the corresponding photosensitive drum, each of the laser scanning units including a laser-light-emitting unit for switching a laser beam on and off in accordance with image data; a polygon mirror for reflecting, while rotating, the laser beam emitted by the laser-light-emitting unit and scanning and expose the corresponding photosensitive drum, the polygon mirror having a plurality of reflective surfaces; a polygon motor for rotating the polygon mirror, the rotational speed of the polygon motor changing in accordance with the frequency of a provided drive signal; and a light-receiving unit for outputting a detection signal having an output value which changes when the laser beam is received, the light-receiving unit being provided within a range of irradiation with the laser beam by the polygon mirror;
a motor control unit for: providing the drive signal of a predetermined base period to the polygon motors and causing the polygon motors to rotate such that each of the polygon motors rotates at the same speed; detecting the time difference between a change point of the detection signal of the laser scanning unit of a reference color and the change points of the detection signals of the laser scanning units of colors targeted for phase correction other than the reference color; and, when the absolute value of the time difference is greater than a predetermined threshold, carrying out a rough adjustment process in which the drive signal with which the base period has been shortened or lengthened by a first period change amount causes the polygon motors of the colors targeted for phase correction to rotate and the time difference to decrease, or, when, as a result of the rough adjustment process, the absolute value is not greater than the threshold, carrying out, successively to the rough adjustment process, a fine adjustment process in which, until the time difference falls within a predetermined acceptable range, the drive signal with which the base period has been shortened or lengthened by a second period change amount smaller than the first period change amount with respect to the base period causing the polygon motors of the colors targeted for phase correction to rotate and the time difference to decrease; and
one correction current supply unit for changing, in a similar manner for each of the laser-light-emitting units, the current flowing to each of the laser-light-emitting units in accordance with the scanning position in a main scanning direction, and for changing the light emission level of each of the laser-light-emitting units and correcting the difference in energy received by the photosensitive drums in the main scanning direction.

2. The image-forming apparatus as set forth in claim 1, comprising:
a transfer unit for superimposingly transferring onto paper a toner image of each color formed on each of the photosensitive drums, and
a fixing unit for fixing, using heat, the toner image transferred onto the paper, the fixing unit having a built-in heater;
the motor control unit, when a warm-up for increasing the temperature of the fixing unit to the temperature needed in order to fix the toner image is performed,
detecting the time difference between the change point of the detection signal of the laser scanning unit of the reference color and the change points of the detection signals of the laser scanning units of the colors targeted for phase correction, carrying out the rough adjustment process when the absolute value of the time difference is greater than the threshold, and, after the absolute value has reached or fallen below the threshold due to the rough adjustment process, carrying out instead of the fine adjustment process an ultrafine adjustment process in which the drive signal with which the base period has been shortened or lengthened by a third predetermined period change amount is used to cause the polygon motors of the colors targeted for phase correction to rotate until the time difference falls within the acceptable range;
the third period change amount being smaller than the second period change amount with respect to the base period.

3. The image-forming apparatus as set forth in claim 2, comprising
a temperature sensor for detecting the temperature of the fixing unit;
the motor control unit, when the temperature detected by the temperature sensor at the start of phase correction is less than a predetermined first temperature, performing the ultrafine adjustment process instead of the rough adjustment process until the time difference falls within the acceptable range.

4. The image-forming apparatus as set forth in claim 3,
the motor control unit, when the temperature detected by the temperature sensor at the start of phase correction is higher than the predetermined second temperature, not performing the ultrafine adjustment process but causing the time difference to fall within the acceptable range using the rough adjustment process and the fine adjustment process,
the second temperature being a higher temperature than the first temperature.

5. The image-forming apparatus as set forth in claim 2,
the first period change amount, the second period change amount, and the third period change amount being change amounts for the drive signal within a range where the rotation of the polygon motors will not be desynchronized.

6. The image-forming apparatus as set forth in claim 2,
the warm-up being performed when a main power source is turned on and when a power-saving mode returns to a normal mode.

7. The image-forming apparatus as set forth in claim 2,
the absolute value of the second period change amount being not greater than one-half of the absolute value of the first period change amount, and the absolute value of the third period change amount being not greater than one-half of the absolute value of the second period change amount.

8. The image-forming apparatus as set forth in claim 1, the first period change amount being the greatest change amount for the drive signal within a range where the rotation of the polygon motors will not be desynchronized.

9. A method for controlling an image-forming apparatus, the method comprising:
providing a drive signal of a predetermined base period to polygon motors for reflecting a laser beam and scanning and exposing a corresponding photosensitive drum, such that each of the polygon motors rotates at the same speed;
causing each of polygon mirrors to rotate by the polygon motors;
causing a light-receiving unit having an output value that changes when the laser beam is received to output a detection signal, the light-receiving unit being provided within a range in which the laser beam is irradiated by the polygon mirrors;
detecting a time difference between a change point in the detection signal for a reference color and change points in detection signals for colors targeted for phase correction other than the reference color;
carrying out, when the absolute value of the time difference is greater than a predetermined threshold, a rough adjustment process in which the drive signal with which the base period has been shortened or lengthened by a first period change amount causes the polygon motors of the colors targeted for phase correction to rotate and the time difference to be reduced; and
carrying out successively to the rough adjustment process, when, as a result of the rough adjustment process, the absolute value is not greater than the threshold, a fine adjustment process in which, until the time difference falls within a predetermined acceptable range, the drive signal with which the base period has been shortened or lengthened by a second period change amount causes the polygon motors of the colors targeted for phase correction to rotate and the time difference to decrease,
the second period change amount being smaller than the first period change amount with respect to the base period,
laser-light-emitting units being caused to switch a laser beam on and off in accordance with image data;
the laser beams emitted by the laser-light-emitting units being reflected and the corresponding photosensitive drum being scanned and exposed; and
one correction current supply unit changing, in a similar manner for each of the laser-light-emitting units, the current flowing to each of the laser-light-emitting units in accordance with the scanning position in a main scanning direction, and changing the light emission level of each of the laser-light-emitting units; and the difference in the main scanning direction in regard to energy received by the photosensitive drums being corrected.

10. The method for controlling an image-forming apparatus as set forth in claim 9, a toner image of each color formed on each of the photosensitive drums being superimposingly transferred onto paper;
a fixing unit being made to fix the transferred toner images to the paper using heat;
the time difference between a change point in the detection signal of the laser-scanning unit for a reference color and change points in detection signals of the laser-scanning unit for colors targeted for phase correction being detected when warm-up is performed for increasing the temperature of the fixing unit to a temperature needed to fix the toner images;
the rough adjustment process being carried out when the absolute value of the time difference is greater than the threshold; and
an ultrafine adjustment process being carried out instead of the fine adjustment process, in which, after the absolute value has reached or fallen below the threshold due to the rough adjustment process, the drive signal with which the base period has been shortened or lengthened by a third predetermined period change amount is used to cause the polygon motors of the colors targeted for phase correction to rotate until the time difference falls within the acceptable range,
the third period change amount being smaller than the second period change amount with respect to the base period.

11. The method for controlling an image-forming apparatus as set forth in claim 10,
a temperature sensor being made to detect the temperature of the fixing unit when the phase correction is to start, and
when the temperature detected by the temperature sensor is less than a predetermined first temperature, only the ultrafine adjustment process and not the rough adjustment process being carried out until the time difference falls within the acceptable range.

12. The method for controlling an image-forming apparatus as set forth in claim 11,
a temperature sensor being made to detect the temperature of the fixing unit when the phase correction is to start, and
when the temperature detected by the temperature sensor is higher than a predetermined second temperature, the time difference being made fall within the acceptable range by the rough adjustment process and the fine adjustment process, without the ultrafine adjustment process being carried out; and
the second temperature being a higher temperature than the first temperature.

13. The method for controlling an image-forming apparatus as set forth in claim 10,
the first period change amount, the second period change amount, and the third period change amount being change amounts for the drive signal within a range where the rotation of the polygon motors will not be desynchronized.

14. The method for controlling an image-forming apparatus as set forth in claim 10,
the warm-up being performed when a main power source is turned on and when a power-saving mode returns to a normal mode.

15. The method for controlling an image-forming apparatus as set forth in claim 10,
the absolute value of the second period change amount being not greater than one-half of the absolute value of the first period change amount, and the absolute value of the third period change amount being not greater than one-half of the absolute value of the second period change amount.

16. The method for controlling an image-forming apparatus as set forth in claim 9,
the first period change amount being the greatest change amount for the drive signal within a range where the rotation of the polygon motors will not be desynchronized.

* * * * *